United States Patent
Dudar

(10) Patent No.: US 10,598,134 B1
(45) Date of Patent: Mar. 24, 2020

(54) SYSTEMS AND METHODS FOR FUEL SYSTEM RECIRCULATION LINE VARIABLE ORIFICE DIAGNOSTICS

(71) Applicant: Ford Global Technologies, LLC, Dearborn, MI (US)

(72) Inventor: Aed Dudar, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/189,621

(22) Filed: Nov. 13, 2018

(51) Int. Cl.
| | |
|---|---|
| *F02M 25/08* | (2006.01) |
| *B60K 15/00* | (2006.01) |
| *F02M 26/49* | (2016.01) |
| *F02M 26/48* | (2016.01) |
| *F02M 26/47* | (2016.01) |
| *B60K 15/04* | (2006.01) |
| *B60K 15/035* | (2006.01) |

(52) U.S. Cl.
CPC ............ *F02M 26/49* (2016.02); *B60K 15/04* (2013.01); *F02M 26/47* (2016.02); *F02M 26/48* (2016.02); *B60K 15/03519* (2013.01)

(58) Field of Classification Search
CPC .. B60K 15/04; B60K 15/03519; F02M 25/08; F02M 25/0809; F02M 25/0836; F02M 25/0845
See application file for complete search history.

(56) References Cited

U.S. PATENT DOCUMENTS

| | | | | |
|---|---|---|---|---|
| 5,143,035 A | * | 9/1992 | Kayanuma | F02M 25/08 123/198 D |
| 5,327,871 A | * | 7/1994 | Gryc | B60K 15/04 123/198 D |
| 5,592,963 A | * | 1/1997 | Bucci | B60K 15/03519 137/202 |
| 5,960,817 A | * | 10/1999 | Johansen | B60K 15/03519 137/202 |
| 6,016,827 A | * | 1/2000 | Dawson | B60K 15/03519 137/202 |
| 9,732,706 B2 | | 8/2017 | Dudar et al. | |
| 9,745,907 B2 | | 8/2017 | Dudar et al. | |
| 2002/0062861 A1 | * | 5/2002 | Devall | B60K 15/03504 137/202 |
| 2015/0275790 A1 | * | 10/2015 | Matsunaga | F02M 25/089 123/519 |
| 2016/0084175 A1 | * | 3/2016 | Dudar | F02M 25/0818 123/521 |
| 2016/0129779 A1 | * | 5/2016 | Shimokawa | B60K 15/03519 137/587 |
| 2017/0045019 A1 | * | 2/2017 | Dudar | F02M 25/0836 |
| 2017/0356360 A1 | * | 12/2017 | Dudar | F02D 41/22 |
| 2018/0099856 A1 | * | 4/2018 | Dudar | B67D 7/049 |
| 2019/0271273 A1 | * | 9/2019 | Dudar | B60K 15/03519 |

OTHER PUBLICATIONS

Dudar, A., "Systems and Methods for Fuel System Recirculation Valve Diagnostics," U.S. Appl. No. 16/012,549, filed Jun. 19, 2018, 84 pages.

* cited by examiner

*Primary Examiner* — Thomas N Moulis

(74) *Attorney, Agent, or Firm* — Geoffrey Brumbaugh; McCoy Russell LLP

(57) ABSTRACT

Methods and systems are provided for carrying out diagnostics of a variable orifice housed in a fuel vapor recovery line. In one example, a method may include, during a refueling event, comparing an expected fuel system pressure to an estimated fuel system pressure to detect if the variable orifice is stuck in an open position or a closed position.

20 Claims, 7 Drawing Sheets

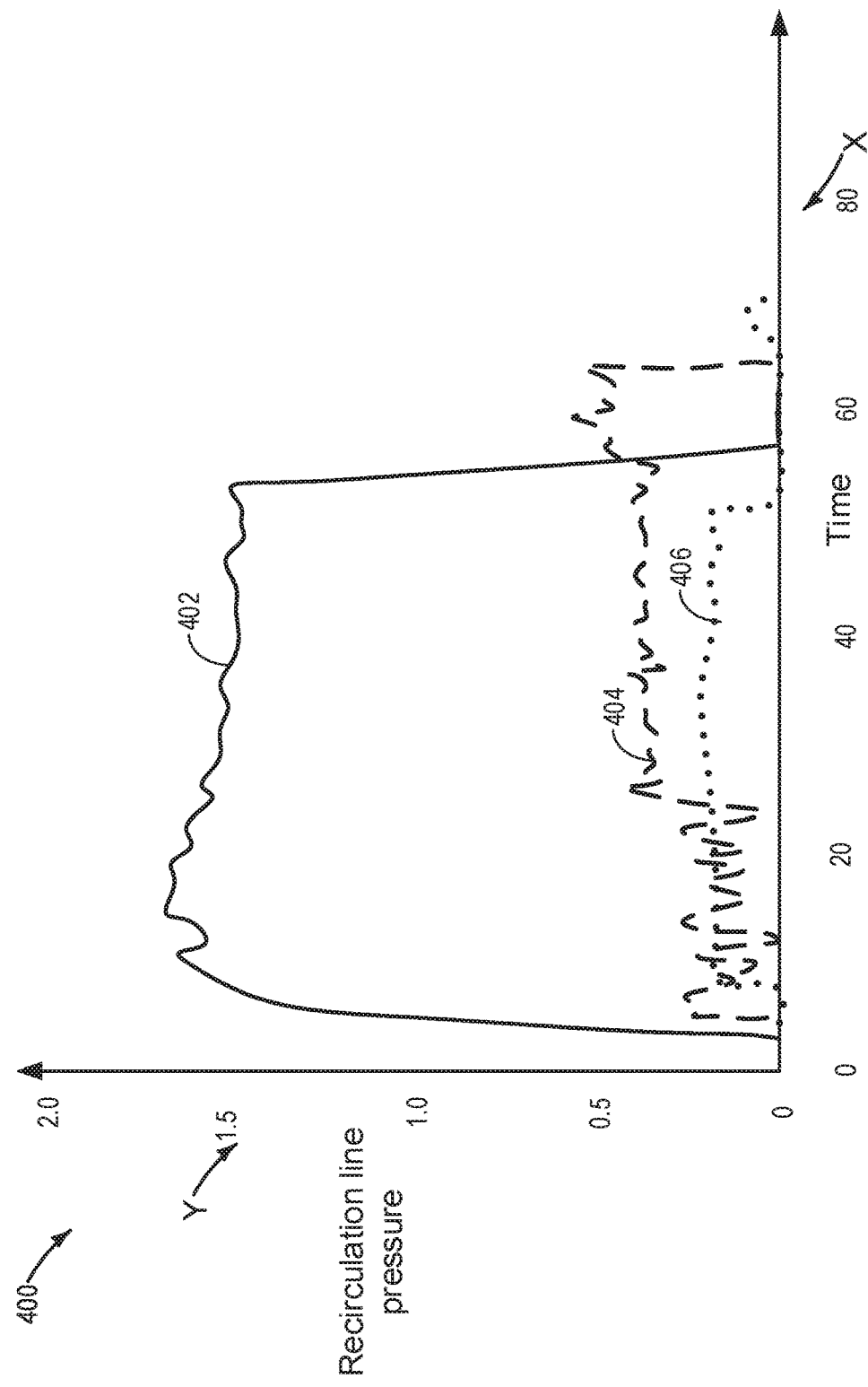

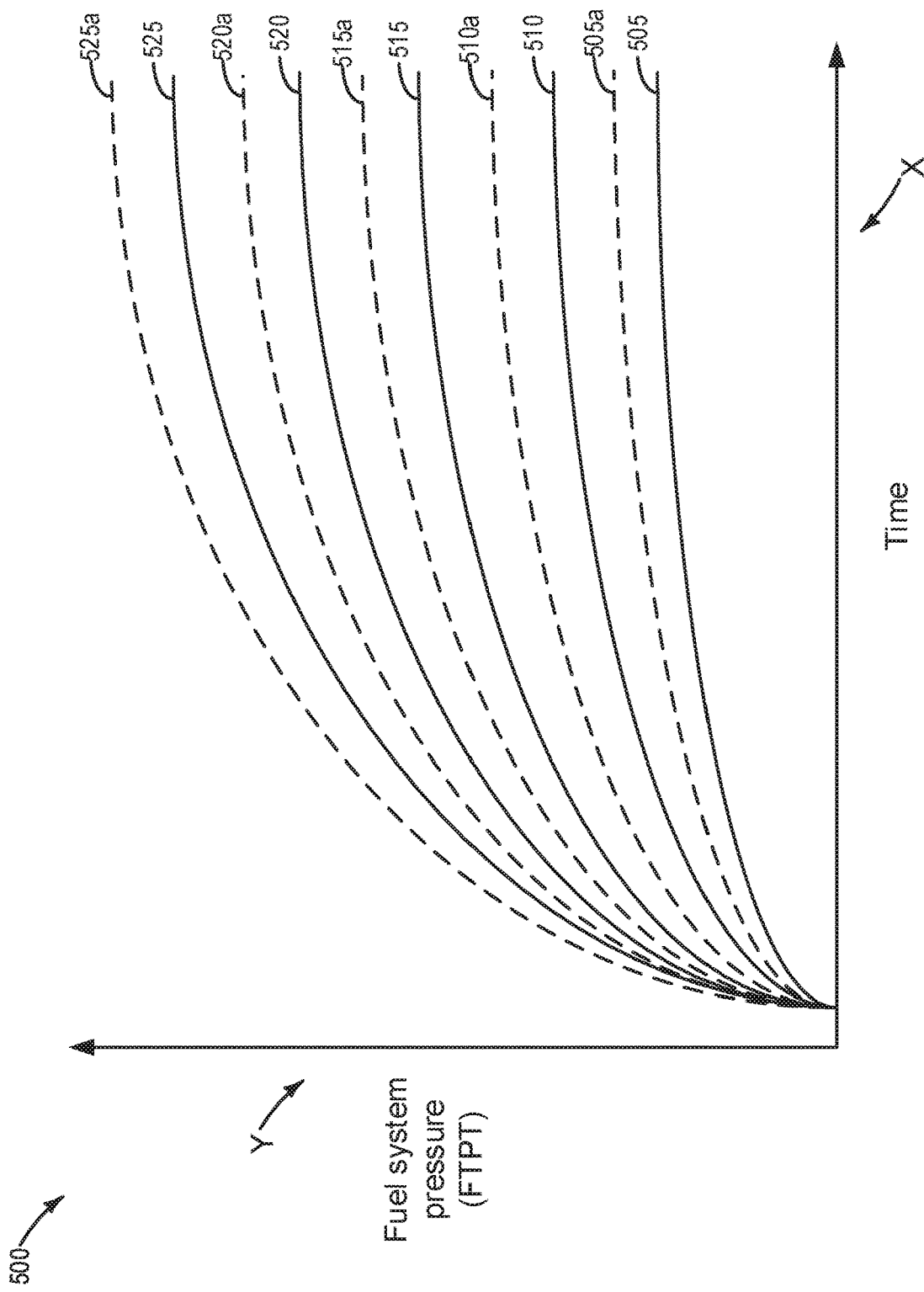

SYSTEMS AND METHODS FOR FUEL SYSTEM RECIRCULATION LINE VARIABLE ORIFICE DIAGNOSTICS

FIELD

The present description relates generally to methods and systems for diagnosing whether a variable orifice positioned in a fuel vapor recirculation line is stuck in one of an open or closed configuration.

BACKGROUND/SUMMARY

Vehicle emission control systems may be configured to store fuel vapors from fuel tank refueling and diurnal engine operations, and then purge the stored vapors during a subsequent engine operation. The fuel vapors may be stored in a fuel vapor canister coupled to the fuel tank which contains adsorbent material, such as activated carbon, capable of adsorbing hydrocarbon fuel vapor.

The fuel tank may be further coupled to a vapor recovery line (vapor recirculation line). The vapor recovery line may be configured to circulate and/or hold a percentage of refueling vapors, thus limiting the rate of fuel vapor canister loading. Fuel vapors may recirculate back to the fuel tank via flowing through the recirculation line and through a filler neck of the fuel tank. Further, depending on the fuel dispenser, the fuel vapors within the vapor recovery line may be returned to the fuel dispenser, thus limiting the total fuel vapor stored within the fuel vapor canister for a given refueling event. By reducing canister loading during refueling events, the canister sizing may be reduced, which may reduce costs and weight associated with the vehicle.

Fuel vapor recirculation lines include orifices to regulate the fuel vapor flow rate through the recirculation line. In many examples, such an orifice comprises a fixed orifice that is set manually via a technician. The size of such an orifice may be configured so as to maximize vapor recirculation without resulting in fuel vapors (e.g. hydrocarbons) exiting to atmosphere via an inlet at the fuel filler neck. However, such orifices of fixed size may not be robust to variability in flow rates of fuel from various fuel dispensers. For example, different fuel stations may have inherent variability in fuel flow rates (e.g. gallons per minute, or GPM). Such variability may result in canister loading of fuel vapors to a greater extent than desired under some circumstances, while resulting in the release of undesired evaporative emissions (e.g. hydrocarbons) to atmosphere via the inlet at the fuel filler neck under other circumstances.

To address such issues, a variable orifice (also referred to herein as a variable orifice valve, recirculation valve, or variable orifice recirculation valve), may be installed in the recirculation line. Such a variable orifice may include an orifice that changes in size as a function of fuel station pump dispense rate. For example, at higher refueling rates it is desirable to re-route a greater amount of fuel vapors to the fuel tank rather than to the canister, thus the variable orifice may open to a greater extent under such conditions. Alternatively, at lower refueling rates it is desirable to re-route a lesser amount of fuel vapors to the fuel tank, thus the variable orifice may close to a greater extent under such conditions.

However, as the variable orifice ages, the variable orifice may stick in one of an open or closed configuration. As an example, a stuck closed variable orifice may result in an undesirable increase in canister loading. In another example where the variable orifice is stuck open, an increase in release of undesired evaporative emissions to atmosphere via the fuel filler neck inlet may result.

Diagnosing whether the variable orifice valve is stuck in one of an open or closed configuration is challenging. The inventors herein have recognized these issues, and have herein developed systems and methods to at least partially address them. In one example, a method for a vehicle comprises, during a refueling event, in response to a first inferred fuel fill rate, diagnosing whether a variable orifice positioned in a fuel vapor recovery line is stuck in a first state, and in response to a second inferred fuel fill rate, diagnosing whether the variable orifice is stuck in a second state including diagnosing the first state and the second state based on an estimated fuel system pressure. In this way, based on a fuel fill rate, by comparing fuel system pressure to an expected pressure, a stuck open or a stuck closed recirculation line orifice may be diagnosed.

In one example, fuel system pressure during refueling at different fuel fill rates may be stored in the controller database as look-up tables. During lower fuel fill rates (such as lower than a threshold), diagnostics for a variable orifice stuck in an open position may be opportunistically carried out, while during higher fuel fill rates (such as higher than a threshold), diagnostics for a variable orifice stuck in a closed position may be opportunistically carried out. During the diagnostics, fuel system pressure may be monitored via a fuel tank pressure transducer (FTPT) and compared to a threshold pressure corresponding to the current fuel fill rate, as retrieved from the look-up tables. If during lower fuel fill rates, the fuel system pressure is lower than the corresponding threshold pressure, it may be inferred that the recirculation line variable orifice may be stuck in an open position. Similarly, if during higher fuel fill rates, the fuel system pressure is higher than the corresponding threshold pressure, it may be inferred that the recirculation line variable orifice may be stuck in a closed position.

In this way, by opportunistically diagnosing the variable orifice at different fuel fill rates, it may be possible to indicate if the variable orifice is stuck in an open position or in a closed position. By using the FTPT sensor for variable orifice diagnostics, additional hardware may not be engaged. The technical effect of diagnosing degradation of the recirculation line variable orifice is that suitable mitigation actions may be undertaken to reduce the possibility of fuel vapor system canister overloading or undesired fuel vapors escaping to the atmosphere via the fuel filler neck inlet. Overall, by monitoring the health of the fuel recirculation line variable orifice, emissions quality may be improved.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIG. 4 shows an example plot of fuel recirculation line pressure as a function of fuel fill rates.

FIG. 5 shows an example plot of fuel system pressure as a function of fuel fill rates for summer fuel and winter fuel.

DETAILED DESCRIPTION

Figure 1:
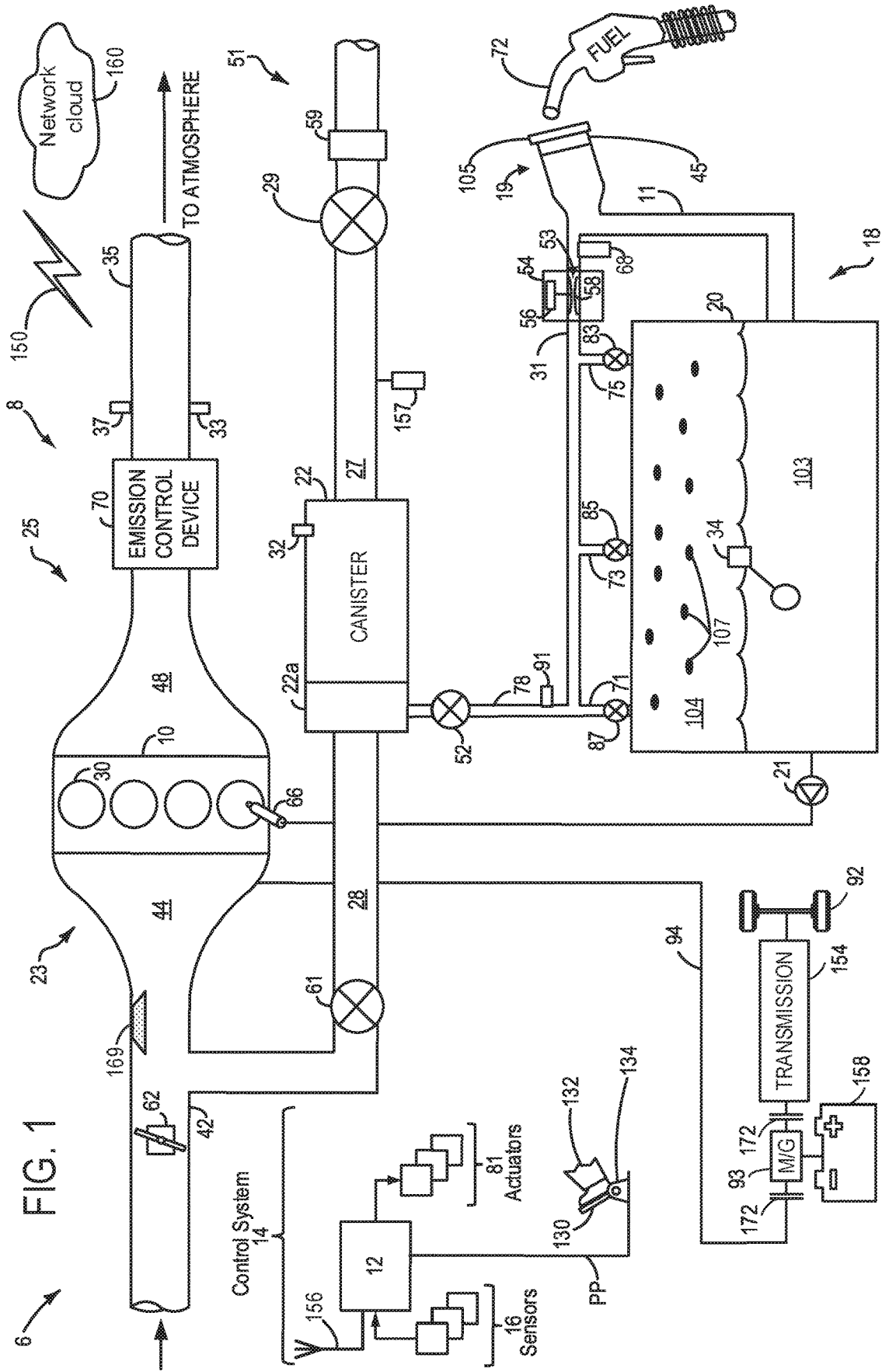
FIG. 1 shows a schematic depiction of a vehicle system including a variable orifice in a fuel vapor recovery line.
Figure 2:
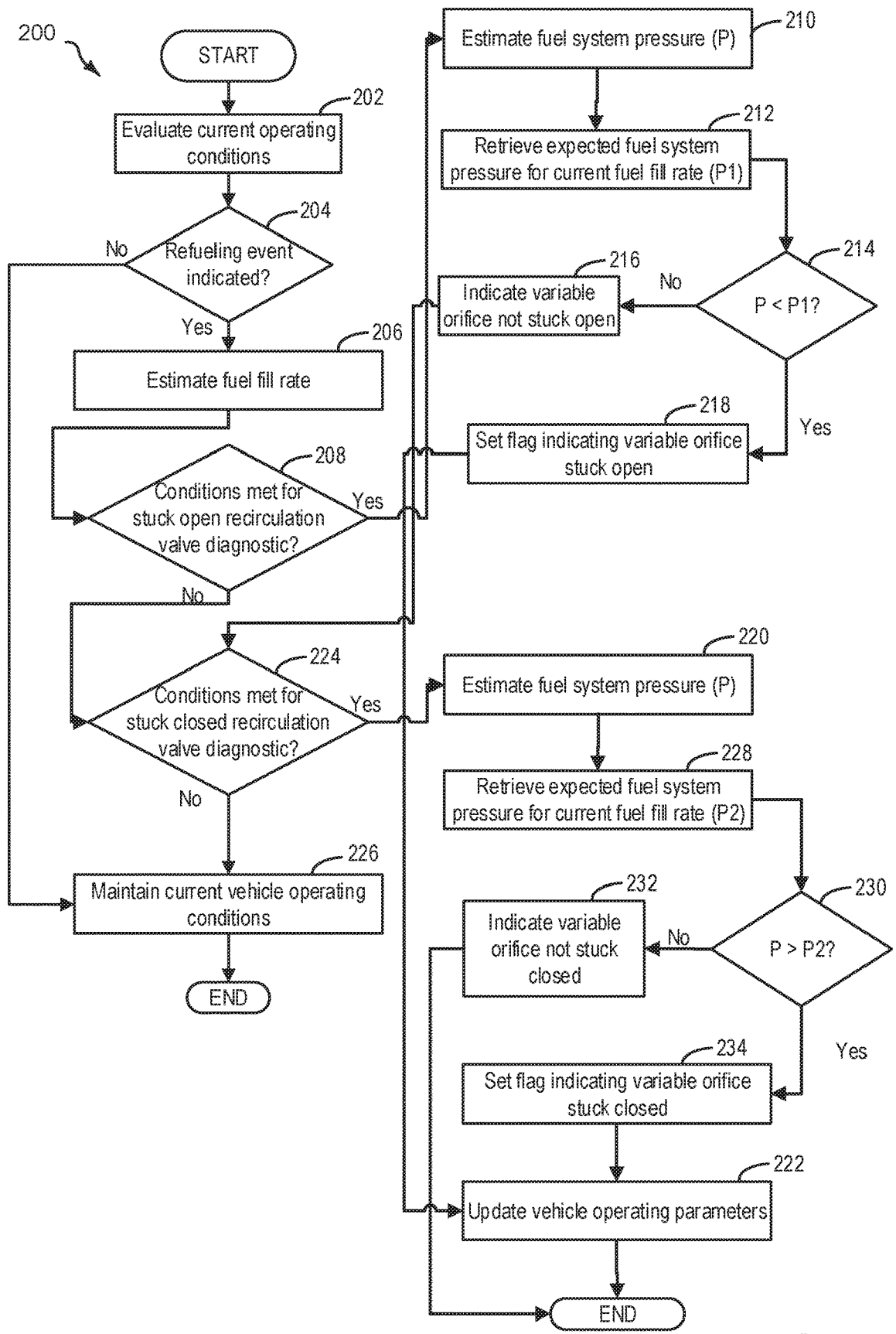
FIG. 2 shows a flowchart for an example method for diagnostics of the variable orifice in FIG. 1
Figure 3A:
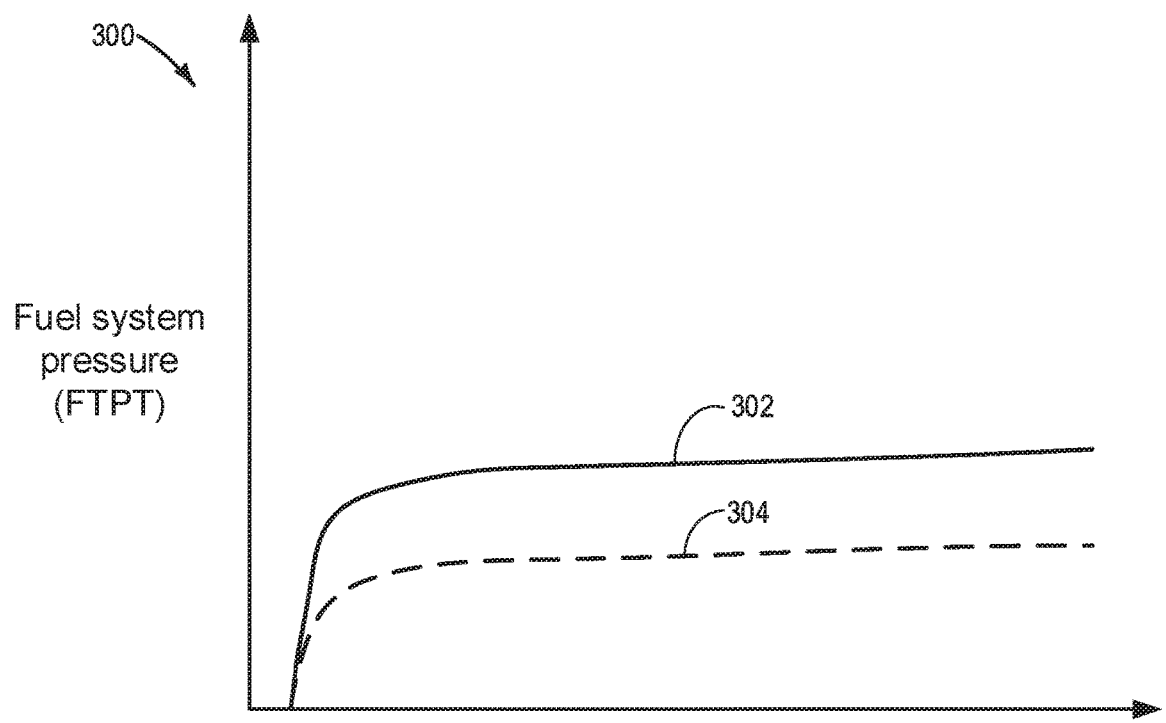
FIG. 3A shows an example plot used for diagnostics of the variable orifice during lower fuel fill rate.
Figure 3B:
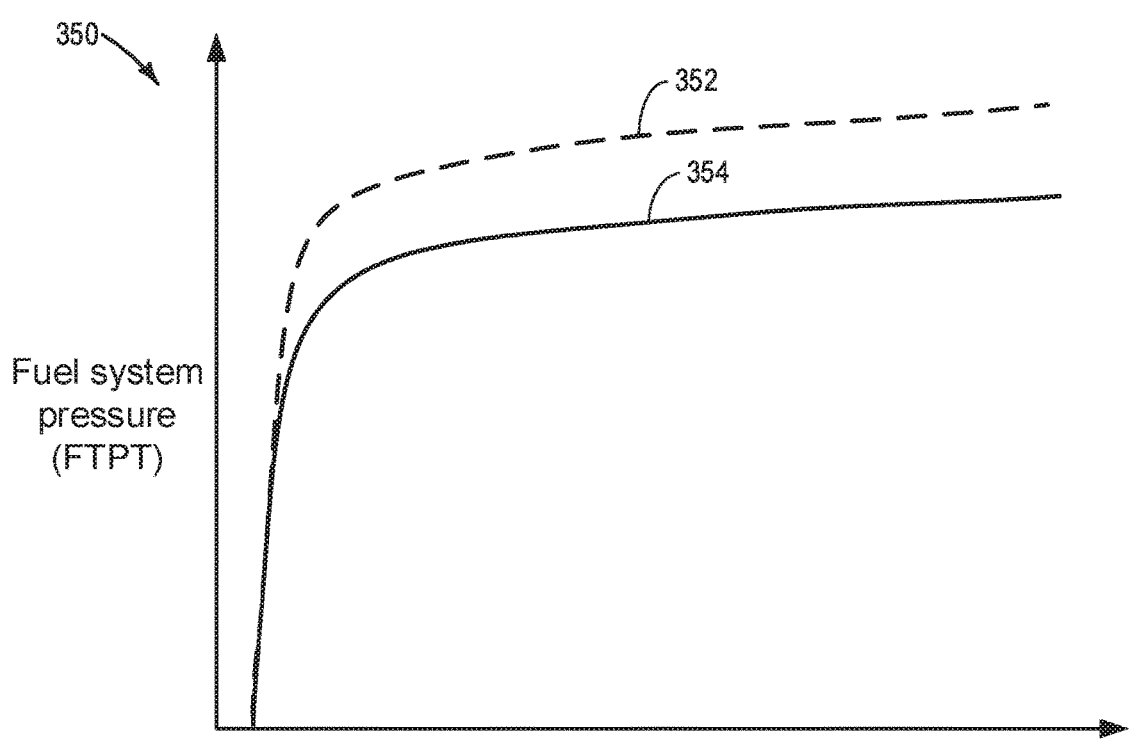
FIG. 3B shows an example plot used for diagnostics of the variable orifice during higher fuel fill rate.
Figure 6:
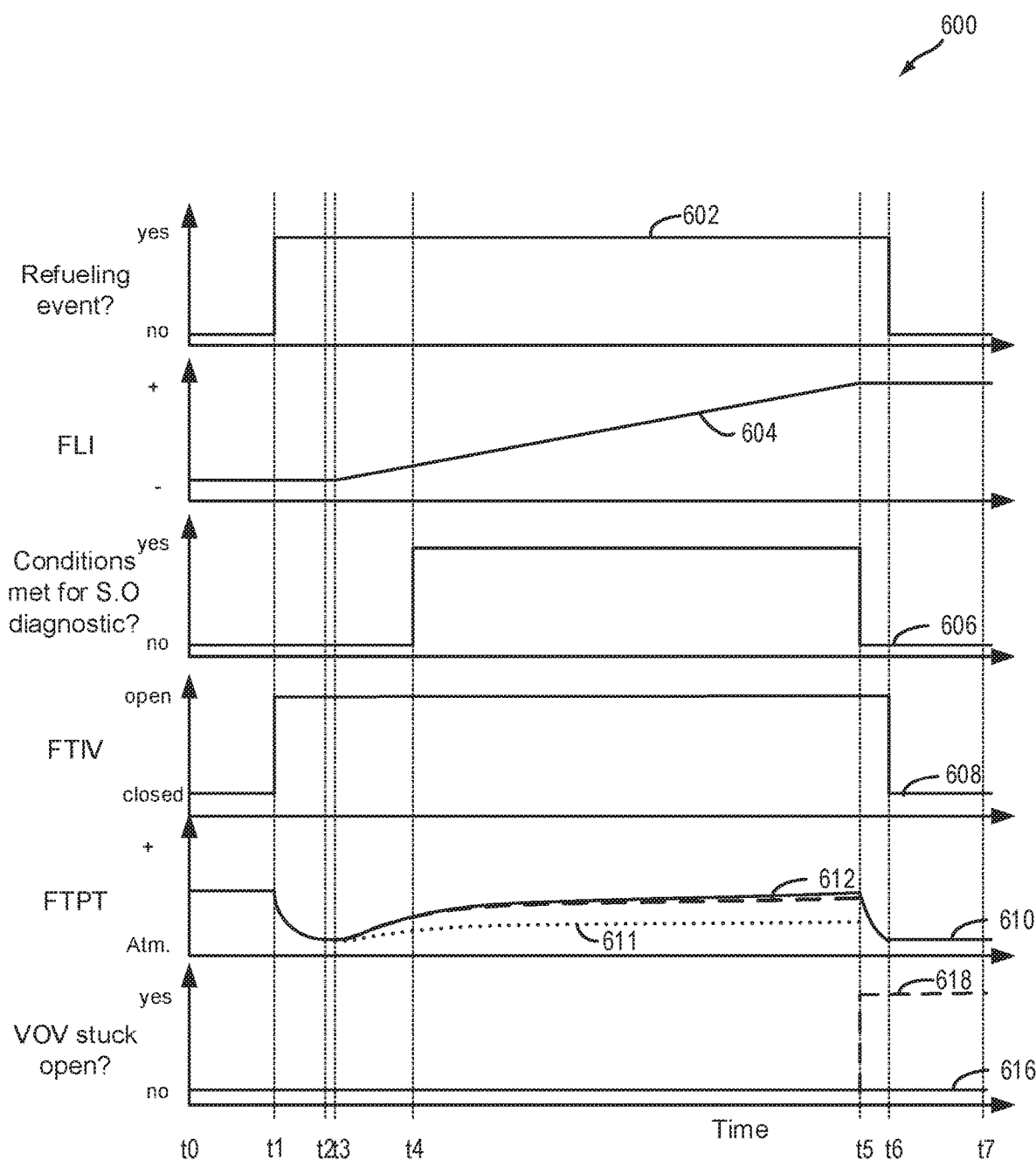
FIG. 6 shows an example timeline for conducting the diagnostic for determining whether the variable orifice is stuck open, according to the method of FIG. 2.
Figure 7:
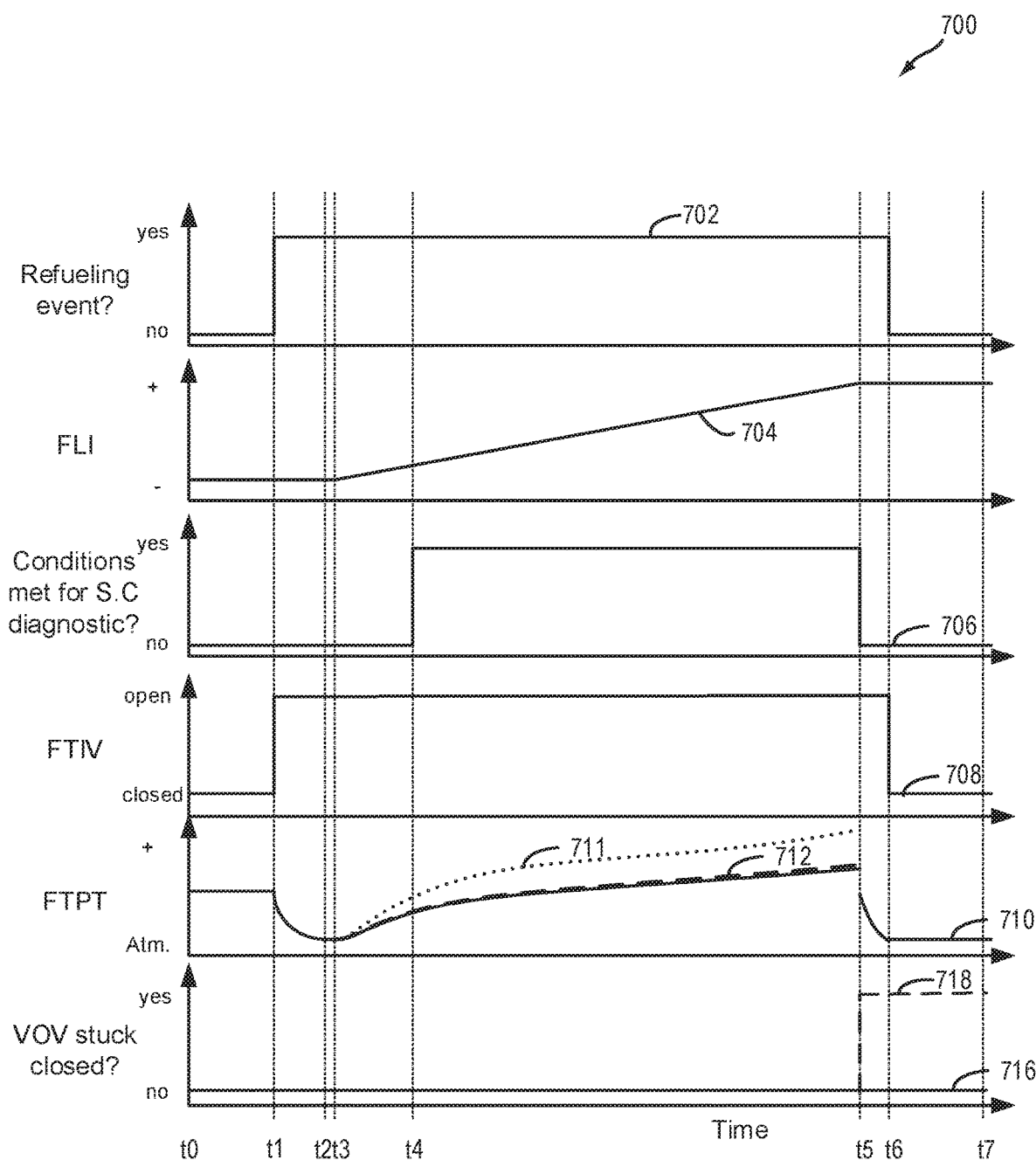
FIG. 7 shows an example timeline for conducting the diagnostic for determining whether the variable orifice is stuck closed, according to the method of FIG. 2.

The following description relates to systems and methods for diagnosing whether a variable orifice positioned in a vapor recovery line of a vehicle fuel system, is functioning as desired or expected. In other words, that the variable orifice is not degraded, where degraded refers to the valve being stuck in a higher-flow configuration or unable to adopt a lower-flow configuration, or being stuck in the lower-flow configuration or unable to adopt the higher-flow configuration. More specifically, a variable orifice that is stuck in a higher-flow position (also referred to herein as stuck open), or in other words is unable to close sufficiently to adopt a lower-flow position (also referred to herein as stuck closed), may result in undesired evaporative emissions being released to atmosphere via a fuel filler system, whereas a variable orifice that is stuck in a lower-flow position, or in other words is unable to open sufficiently to adopt a higher-flow position, may result in increased loading of a fuel vapor canister configured to trap and store fuel vapors, which may thus result in increased bleed emissions due to fuel vapor breakthrough from the canister. FIG. 1 illustrates a vehicle with a fuel system selectively fluidically coupled to an evaporative emissions system that includes a fuel vapor canister. The fuel system depicted at FIG. 1 illustrates a fuel vapor recovery line, with a variable orifice positioned in the fuel vapor recovery line. Such diagnostics discussed herein rely on refueling events where fuel vapors are recirculated and routed to the fuel vapor canister for storage. An engine controller may be configured to perform an example routine, such as according to the method described in FIG. 2, to diagnose if a variable orifice is stuck in an open position or a closed position. Example plots for diagnostics of the variable orifice during lower flow conditions and higher flow conditions are shown in FIGS. 3A-3B. Change in pressure in the fuel vapor recirculation system during refilling, based on fuel fill rate, is shown in FIG. 4. FIG. 5 depicts various pressures in the fuel system as a function of fuel fill rate (in gallons per minute), for both summer and winter fuel. Example diagnostics of the variable orifice is shown in FIGS. 6 and 7. Discussed herein, it may be understood that an indication that diagnosing the variable orifice valve being stuck in the lower-flow configuration may comprise an indication that the variable orifice valve is unable to adopt the higher-flow configuration, whereas diagnosing the variable orifice valve being stuck in the higher-flow configuration may comprise an indication that the variable orifice valve is unable to adopt the lower-flow configuration.

FIG. 1 shows a schematic depiction of a vehicle system 6. The vehicle system 6 includes an engine system 8 coupled to an emissions control system 51 and a fuel system 18. Emission control system 51 includes a fuel vapor container or canister 22 which may be used to capture and store fuel vapors. In some examples, vehicle system 6 may be a hybrid electric vehicle system, discussed in further detail below.

The engine system 8 may include an engine 10 having a plurality of cylinders 30. The engine 10 includes an engine intake 23 and an engine exhaust 25. The engine intake 23 includes a throttle 62 fluidly coupled to the engine intake manifold 44 via an intake passage 42. The throttle 62 may be in electrical communication with a controller 12, and as such may be an electronically controlled throttle. Said another way, the controller 12, may send signals to an actuator of the throttle 62, for adjusting the position of the throttle 62. The position of the throttle 62 may be adjusted based on one or more of a desired engine torque, desired air/fuel ratio, barometric pressure, etc. Further, in examples where in the intake includes a compressor such as a turbocharger or supercharger, the position of the throttle 62 may be adjusted based on an amount of boost in the intake passage 42.

The engine exhaust 25 includes an exhaust manifold 48 leading to an exhaust passage 35 that routes exhaust gas to the atmosphere. The atmosphere includes the ambient environment surrounding the vehicle, which may have an ambient temperature and pressure (such as barometric pressure). The engine exhaust 25 may include one or more emission control devices 70, which may be mounted in a close-coupled position in the exhaust. One or more emission control devices may include a three-way catalyst, lean NOx trap, diesel particulate filter, oxidation catalyst, etc. It will be appreciated that other components may be included in the engine such as a variety of valves and sensors.

The vehicle system 6 may be controlled by controller 12 and/or input from a vehicle operator 132 via an input device 130. The input device 130 may comprise an accelerator pedal and/or a brake pedal. A position sensor 134 may be coupled to the input device 130, for measuring a position of the input device 130, and outputting a pedal position (PP) signal to the controller 12. As such, output from the position sensor 134 may be used to determine the position of the accelerator pedal and/or brake pedal of the input device 130, and therefore determine a desired engine torque. Thus, a desired engine torque as requested by the vehicle operator 132 may be estimated based on the pedal position of the input device 130. In response to changes in the desired engine torque as determined based on changes in the position of the input device 130, the controller 12 may adjust the position of throttle 62, and/or injectors of engine 10 to achieve the desired engine torque while maintaining a desired air/fuel ratio.

Fuel system 18 may include a fuel tank 20 coupled to a fuel pump system 21. The fuel pump system 21 may include one or more pumps for pressurizing fuel delivered to the injectors of engine 10, such as the example injector 66 shown. While only a single injector 66 is shown, additional injectors are provided for each cylinder. It will be appreciated that fuel system 18 may be a return-less fuel system, a return fuel system, or various other types of fuel system. Fuel tank 20 may hold a plurality of fuel blends, including fuel with a range of alcohol concentrations, such as various gasoline-ethanol blends, including E10, E85, gasoline, etc., and combinations thereof. A fuel level sensor 34 located in fuel tank 20 may provide an indication of the fuel level ("Fuel Level Input") to controller 12. As depicted, fuel level sensor 34 may comprise a float connected to a variable resistor. Alternatively, other types of fuel level sensors may be used. Thus, during a refueling event, outputs from the fuel level sensor 34 may be used to estimate a mass flow rate of fuel being added to the tank 20.

Fuel tank 20 may be partially filled with liquid fuel 103, but a portion of the liquid fuel 103 may evaporate over time, producing fuel vapors 107 in an upper dome portion 104 of the tank 20. The amount of fuel vapors 107 produced may depend upon one or more of the ambient temperature, fuel level, and positions of valves 83, 85, and 87. For example, an amount of fuel vapors 107 in the fuel tank 20 may increase with increasing ambient temperatures, as warmer temperatures may result in increased evaporation of fuel 103 in the fuel tank 20.

A fuel tank pressure sensor (FTPT) 91 may be physically coupled to the fuel tank 20 for measuring and/or estimating the pressure in the fuel tank 20. Specifically, FTPT 91 may be in electrical communication with controller 12, where outputs from the FTPT 91 may be used to estimate a pressure in the fuel tank 20. Further, an amount of fuel vapors in the fuel tank 20 may be estimated based on the pressure in the fuel tank 20 and/or the fuel level in the fuel tank 20 as estimated based on outputs from fuel level sensor 34. In still further examples, outputs from the FTPT 91 may be used to estimate a fuel flow rate into the fuel tank 20. Thus, based on changes in the pressure as estimated based on outputs from the FTPT 91, a mass flow rate of fuel flowing into the tank 20 during a refueling event may be estimated. Specifically, during a refueling event, where fuel is added to the tank 20, the fuel pressure in the tank 20 may increase. As such, a mass flow rate of fuel flowing into the tank 20 may be inferred from changes in the fuel pressure in the tank 20, where the mass flow rate may increase with increasing rates of change in the fuel tank pressure. In the example shown in FIG. 1, the FTPT 91 may be positioned between the fuel tank 20 and the canister 22. However in other examples, the FTPT may be coupled directly to the fuel tank 20. In still further examples the FTPT may be coupled directly to the canister 22.

Vapors generated in fuel system 18 may be routed to the evaporative emissions control system (EVAP) 51 which includes fuel vapor canister 22 via vapor storage line 78, before being purged to the engine intake 23. Vapor storage line 78 may be coupled to fuel tank 20 via one or more conduits and may include one or more valves for isolating the fuel tank during certain conditions. For example, vapor storage line 78 may be coupled on a first end to fuel tank 20 via one or more or a combination of conduits 71, 73, and 75. Further, the vapor storage line 78 may be coupled on an opposite, second end to the canister 22, specifically buffer 22a, for providing fluidic communication between the fuel tank 20 and the canister 22.

In some examples, the flow of air and vapors between fuel tank 20 and canister 22 may be regulated by a fuel tank isolation valve 52 (FTIV). Thus, FTIV 52 may control venting of fuel tank 20 to the canister 22. FTIV 52 may be a normally closed valve, that when opened, allows for the venting of fuel vapors from fuel tank 20 to canister 22. During a refueling event, the FTIV may adjusted to a more open position to mitigate buildup of excess fuel vapor pressure in the fuel tank 20. Fuel vapors stored in the canister 22, may then be vented to atmosphere, or purged to engine intake system 23 via canister purge valve 61 positioned in a purge line 28. Specifically, during a purging operation, a canister vent valve (CVV) 29 and the CPV 61 may be opened to allow fresh, ambient air to flow through the canister 22. Fuel vapors in the canister may be desorbed as fresh air flows through the canister, and the desorbed fuel vapors may be purged to the intake manifold 44 due to the vacuum generated in the intake manifold 44 during engine operation. Flow of air and vapors between canister 22 and the atmosphere may be regulated by the canister vent valve (CVV) 29, which may be positioned within vent line 27.

Emissions control system 51 may include fuel vapor canister 22. Canister 22 may be filled with an appropriate adsorbent, and may be configured to temporarily trap fuel vapors (including vaporized hydrocarbons) during fuel tank refilling operations and "running loss" (that is, fuel vaporized during vehicle operation). In one example, the adsorbent used is activated charcoal. Emissions control system 51 may further include canister ventilation path or vent line 27 which may provide fluidic communication between canister 22 and the atmosphere. Vent line 27 may be coupled on a first end to the canister 22, and may be open to the atmosphere on an opposite, second end. CVV 29 may be positioned within the vent line 27, and may be adjusted to a closed position to fluidically seal the canister 22 from the atmosphere. However, during certain engine operating conditions, such as during purging operations, the CVV 29 may be opened to allow fresh, ambient air through the vent line 27 and into the canister, to increase fuel vapor desorption in the canister 22. In other examples, the CVV 29 may be opened during fuel vapor storing operations (for example, during fuel tank refueling and while the engine is not running) so that air, stripped of fuel vapor after having passed through the canister 22, can be pushed out to the atmosphere.

Canister 22 may include a buffer 22a (or buffer region), each of the canister and the buffer comprising the adsorbent. As shown, the volume of buffer 22a may be smaller than (e.g., a fraction of) the volume of canister 22. The adsorbent in the buffer 22a may be same as, or different from, the adsorbent in the canister (e.g., both may include charcoal). Buffer 22a may be positioned within canister 22 such that during canister loading, fuel tank vapors are first adsorbed within the buffer, and then when the buffer is saturated, further fuel tank vapors are adsorbed in the canister. In comparison, during canister purging, fuel vapors are first desorbed from the canister (e.g., to a threshold amount) before being desorbed from the buffer. In other words, loading and unloading of the buffer is not linear with the loading and unloading of the canister. As such, the effect of the canister buffer is to dampen any fuel vapor spikes flowing from the fuel tank to the canister, thereby reducing the possibility of any fuel vapor spikes going to the engine.

Fuel vapor levels in the canister 22 may also be referred to as an amount of canister loading. Thus, canister loading increases with increasing level of fuel vapors stored in the canister 22. Canister loading may be estimated based on outputs from one or more sensors. In the example of FIG. 1, a temperature sensor 32 may be coupled to the canister 22 for measuring an amount fuel vapor levels in the canister 22. Specifically, outputs from the sensor 32 corresponding to a temperature in the canister 22 may be used to infer an amount of fuel vapors stored in the canister 22. Increases in fuel vapors levels in the canister 22 may cause increases in the temperature of the canister 22, and as such a relationship may be established between canister temperatures and canister loading. In some examples, vent line 27 may include an air filter 59 disposed therein, upstream of canister 22.

A hydrocarbon sensor 157 may be positioned in the vent line 27 for measuring an amount of undesired evaporative emissions exiting the vent line 27 to the atmosphere. Such undesired evaporative emissions may be referred to as bleed-through emissions. Sensor 157 may be in electrical communication with controller 12, and outputs from the sensor 157 may be used by the controller 12 to estimate an amount of bleed-through emissions escaping to the atmosphere from the canister 22 via the vent line 27.

In some examples, an air intake system hydrocarbon trap (AIS HC) 169 may be placed in the intake manifold of engine 10 to adsorb fuel vapors emanating from unburned fuel in the intake manifold, puddled fuel from leaky injectors and/or fuel vapors in crankcase ventilation emissions during engine-off periods. The AIS HC may include a stack of consecutively layered polymeric sheets impregnated with HC vapor adsorption/desorption material. Alternately, the adsorption/desorption material may be filled in the area between the layers of polymeric sheets. The adsorption/desorption material may include one or more of carbon, activated carbon, zeolites, or any other HC adsorbing/desorbing materials. When the engine is operational causing an intake manifold vacuum and a resulting airflow across the AIS HC, the trapped vapors are passively desorbed from the AIS HC and combusted in the engine. Thus, during engine operation, intake fuel vapors are stored and desorbed from AIS HC 169. In addition, fuel vapors stored during an engine shutdown can also be desorbed from the AIS HC during engine operation. In this way, AIS HC 169 may be continually loaded and purged, and the trap may reduce evaporative emissions from the intake passage even when engine 10 is shut down.

Fuel system 18 and/or EVAP system 51 may be operated by controller 12 in a plurality of modes by selective adjustment of the various valves and solenoids. One or more of valves 29, 52, and 61 may be normally closed valves. For example, the fuel system may be operated in a fuel vapor storage mode (e.g., during a fuel tank refueling operation and with the engine not running), wherein the controller 12 may open isolation valve 52 while closing canister purge valve (CPV) 61 to direct refueling vapors into canister 22 while preventing fuel vapors from being directed into the intake manifold and/or to the atmosphere.

As another example, the fuel system 18 and/or EVAP system 51 may be operated in a refueling mode (e.g., when fuel tank refueling is requested by a vehicle operator), wherein the controller 12 may open isolation valve 52, while maintaining canister purge valve 61 closed, to depressurize the fuel tank before allowing fuel to be added therein. As such, isolation valve 52 may be kept open during the refueling operation to allow refueling vapors to be stored in the canister. After refueling is completed, the isolation valve may be closed.

As yet another example, the fuel system 18 and/or EVAP system 51 may be operated in a canister purging mode (e.g., after an emission control device light-off temperature has been attained and with the engine running), wherein the controller 12 may open canister purge valve 61 and CVV 29 while closing isolation valve 52. Herein, the vacuum generated by the intake manifold of the operating engine may be used to draw fresh air through vent line 27 and through fuel vapor canister 22 to purge the stored fuel vapors into intake manifold 44. In this mode, the purged fuel vapors from the canister are combusted in the engine. The purging may be continued until the stored fuel vapor amount in the canister is below a threshold.

Based on one or more of the estimated fuel vapor levels in the canister 22, vacuum level in the intake manifold, and a desired purge flow rate, the controller 12, may adjust the position of valves 61 and 29 and 52. Thus, in some examples valves 61, 29 and 52 may be actively controlled valves, and may each be coupled to an actuator (e.g., electromechanical, pneumatic, hydraulic, etc.), where each actuator may receive signals from the controller 12 to adjust the position of its respective valve. However, in other examples, the valves may not be actively controlled, and instead may be passively controlled valves, where the position of the valves may change in response to changes in pressure, temperature, etc., such a wax thermostatic valve.

In examples where the valves 61, 29, and 52 are actively controlled, the valves 61, 29, and 52 may be binary valves, and the position of the valves may be adjusted between a fully closed first position and a fully open second position. However in other examples, the valves 61, 29, and 52 may be continuously variable valves, and may be adjusted to any position between the fully closed first position and fully open second position. Further, the actuators may be in electrical communication with the controller 12, so that electrical signals may be sent between the controller 12 and the actuators. Specifically, the controller may send signals to the actuators to adjust a position of the valves 61, 29, and 52 based on one or more of fuel vapor levels in the canister 22, pressure in the fuel tank 20, fuel level in the fuel tank 20, vacuum level in the intake manifold 44, etc. In some examples, the controller 12 may send signals to the actuators to open one or more of valves 61 and 29, and therefore purge the canister 22, in response to fuel vapor levels in the canister 22 exceeding a threshold. In examples where valves 61, 29 and 52 are solenoid valves, operation of the valves may be regulated by adjusting a driving signal (or pulse width) of the dedicated solenoid.

The fuel tank 20 may include one or more vent valves, which may be deposed in conduits 71, 73, or 75. Among other functions, fuel tank vent valves may allow a fuel vapor canister of the emissions control system to be maintained at a low pressure or vacuum without increasing the fuel evaporation rate from the tank (which would otherwise occur if the fuel tank pressure were lowered). For example, conduit 71 may include a first grade vent valve (GVV) 87, conduit 73 may include a fill limit venting valve (FLVV) 85, and conduit 75 may include a second grade vent valve (GVV) 83.

The fuel system 18 may further include a fuel vapor recirculation tube or line 31 (also referred to herein as a fuel vapor recovery line), which may be coupled to the fuel tank 20, and to a fuel fill inlet (also referred to herein as fuel fill system) 19. Specifically, the fuel vapor recirculation line 31, may be coupled to the fuel tank 20, via one or more of conduits 71, 73, and/or 75.

The fuel vapor recirculation line 31 and/or the fuel vapor storage line 78 may be configured to hold a percentage of total fuel vapor generated during a refueling event. For example, the vapor recirculation line 31 and/or fuel vapor storage line 78 may in some examples be configured to hold approximately 20% of the total fuel vapor generated during a refueling event. However, in other examples, the recirculation line 31 and/or storage line 78 may be configured to hold more or less than 20% of the total fuel vapors generated in the fuel tank 20. By effectively increasing the vapor dome volume of the fuel tank 20, the recirculation line 31 may limit the rate of flow of fuel vapors 107 to the fuel vapor canister 22. Depending on the configuration of the fuel dispenser, a portion of the fuel vapor held within the recirculation line 31 may be returned to the fuel dispenser.

Recirculation line 31 may include a variable orifice 54 (also referred herein as variable orifice valve or continuously variable orifice recirculation valve). The variable orifice valve 54 may include a flow restriction 58, which may be a diaphragm, ball, plunger, etc., which restricts flow through the valve 54. Thus, an orifice 53 may be formed by the flow restriction 58, where the size of the orifice 53 may be adjusted by adjusting the flow restriction 58. Specifically, adjusting the flow restriction 58 to a more open position may increase the size of the orifice 53, and thereby may increase an amount of gasses flowing through the valve 54. Conversely, adjusting the flow restriction 58 to a more closed position may decrease the size of the orifice 53, thereby decreasing an amount of gasses flowing through the valve 54. In the description herein, closing the valve 54 comprises adjusting the flow restriction 58 to a more closed position (where a lower-flow configuration comprises the maximal extent the valve can close). Similarly, opening the valve 54 comprises adjusting the flow restriction 58 to a more open position (where a higher-flow configuration comprises the maximal extent the valve can open). In some examples, the valve 54 may include only one orifice. However, in other examples, the valve 54 may include more than one orifice, where the size of each orifice may be adjustable.

A position of the flow restriction 58 may be adjusted by an actuator 56 of valve 54. The actuator may in some examples be an electromechanical actuator. In other embodiments, the actuator may be hydraulic or pneumatic. In one example, the actuator is spring actuated, in response to pressure in the vapor recovery line. For example, a spring comprising the actuator 56 may hold the orifice 53 in a lower-flow position when pressure in the vapor recovery line is below a first threshold pressure. Then, increasing pressure in the vapor recovery line may act on the spring, for example compressing the spring, which may thus result in the orifice opening further, the extent of opening based on the amount of pressure in the vapor recovery line. When pressure in the vapor recovery line is great enough, for example above a second threshold pressure, the spring may be compressed such that orifice 53 may occupy a higher-flow position. The variable orifice valve 54 may adopt to a lower-flow configuration during refueling at the lower than threshold fuel fill rate and the variable orifice valve 54 may adopt to the higher-flow configuration during refueling at the higher than threshold fuel fill rate. It may be understood that under conditions where the valve 54 is spring-actuated, the valve is passively actuated in response to pressure in the vapor recovery line 31.

In some examples the actuator 56 may be included within the valve 54. However, in other examples, the actuator 56 may be external to the valve 54, but may be physically coupled to the valve 54. The actuator 56 is mechanically coupled to the flow restriction 58, for adjusting the position of the flow restriction 58, and therefore the size of the orifice 53. Thus, in an example where the actuator 56 comprises a spring actuator, the spring is mechanically coupled to the flow restriction for adjusting the size of the orifice 53. In an example where the actuator 56 comprises an electromechanical actuator 56, the actuator 56 may be an electric motor comprising a solenoid and armature assembly for generating rotational motion from electrical input.

Thus, in some examples the actuator 56 may be in electrical communication with the controller 12. Based on signals received from the controller 12, the actuator 56 may adjust the position of the flow restriction 58 to adjust the size of the orifice 53. Said another way, the controller 12 may send signals to the actuator 56 to adjust the size of the orifice 53 by adjusting the position of the flow restriction 58. More specifically, a pulse width modulated (PWM) signal may be communicated to the actuator 56 by the controller 12. In one example, the PWM signal may be at a frequency of 10 Hz. In another example, the actuator 56 may receive a PWM signal of 20 Hz. In yet another examples, the solenoid of the actuator 56 may be actuated synchronously.

By adjusting the size of the orifice 53, an amount of air and/or fuel vapors flowing through recirculation line 31 may be adjusted. However, as discussed above, there may be circumstances where the variable orifice valve becomes stuck at the lower-flow or higher-flow position. It is desirable to diagnose such conditions of degradation because if the valve becomes stuck in the lower-flow position, the canister may be loaded to greater extents during refueling events, which may lead to bleed-through emissions from the canister. Alternatively, if the valve becomes stuck in the higher-flow position, release of undesired evaporative emissions via the fuel filler system may result during refueling events.

As discussed herein, a diagnostic for a stuck-closed variable orifice valve 54 may comprise a diagnostic as to whether the variable orifice valve is stuck in the lower-flow position, or substantially in the lower-flow position (e.g. not different than the lower-flow position by more than a 5% difference, 10% difference, 20% difference, etc.). In one example, rather than specifically indicating the variable orifice valve is stuck in the lower-flow position, the diagnostic may indicate the variable orifice valve is not capable of adopting the higher-flow position.

Alternatively, a diagnostic for a stuck-open variable orifice valve 54 may comprise a diagnostic as to whether the variable orifice valve is stuck in the higher-flow position, or substantially in the higher-flow position (e.g. not different than the higher-flow position by more than a 5% difference, 10% difference, 20% difference, etc.). In one example, rather than specifically indicating the variable orifice valve is stuck in the higher-flow position, the diagnostic may indicate the variable orifice valve is not capable of adopting the lower-flow position.

The variable orifice valve 54 may be diagnosed to be stuck in an open position in response to an estimated fuel system pressure being lower than a first expected fuel system pressure, the first expected fuel system pressure being a function of the first inferred fuel fill rate and ambient weather conditions. Similarly, the variable orifice valve 54 may be diagnosed to be stuck in closed position in response to the estimated fuel system pressure being higher than a second expected fuel system pressure, the second expected fuel system pressure being a function of the second inferred fuel fill rate and the ambient weather conditions. Each of the first expected fuel system pressure and the second expected fuel system pressure may be retrieved from an on-board or off-board database storing expected fuel system pressure data corresponding to a plurality of fuel fill rates and ambient weather conditions (season). Accordingly, an example method for diagnosing whether the variable orifice valve 54 is stuck in the lower-flow position or a higher-flow position is depicted at FIG. 2. In response to the variable orifice valve 54 being stuck in a closed position, after completion of the refueling event, a purging frequency of a fuel vapor canister of the fuel vapor system may be increased, and response to the variable orifice valve 54 being stuck in an open position, during an immediately subsequent refueling event, a canister purge valve housed in a purge line coupling a fuel vapor system to an engine intake manifold may be duty-cycled to route fuel vapor to the engine intake manifold.

In some examples, vapor recirculation line 31 may further include a pressure sensor 68 configured to measure a pressure in the recirculation line 31. Outputs from the sensor 68 may be used by the controller 12 to estimate a pressure in the recirculation line 31. In some examples, based on the outputs from the sensor 68, the controller 12 may send signals to the actuator 56 to adjust the position of the flow restriction 58.

Thus, fuel vapors 107 from fuel tank 20 may be directed through the recirculation line 31 and valve 54, on route to the fuel fill inlet 19. Fuel fill inlet 19 may be configured to receive fuel from a fuel source such as dispensing nozzle 72. During a refueling event, the nozzle 72 may be inserted into the fill inlet 19, and fuel may be dispensed into the fuel tank 20. Thus a refueling event comprises the dispensing of fuel from a fuel source into the fuel tank 20. In some examples, fuel fill inlet 19 may include a fuel cap 105 for sealing off the fuel fill inlet 19 from the atmosphere. However, in other examples, the fuel fill inlet 19 may be a capless design and may not include a fuel cap 105. Fuel filler inlet 19 is coupled to fuel tank 20 via fuel filler pipe or neck 11. As such, fuel dispensed from the nozzle 72, may flow through the filler neck 11 into the tank 20.

Fuel fill inlet 19 may further include refueling lock 45. In some embodiments, refueling lock 45 may be a fuel cap locking mechanism. The refueling lock 45 may be configured to automatically lock the fuel cap 105 in a closed position so that the fuel cap 105 cannot be opened. For example, the fuel cap 105 may remain locked via refueling lock 45 while pressure or vacuum in the fuel tank is greater than a threshold. In response to a refuel request, e.g., a vehicle operator initiated request, the fuel tank 20 may be depressurized and the fuel cap 105 unlocked after the pressure or vacuum in the fuel tank 20 falls below a threshold. The refueling lock 45 may be a latch or clutch, which, when engaged, prevents the removal of the fuel cap 105. The latch or clutch may be electrically locked, for example, by a solenoid, or may be mechanically locked, for example, by a pressure diaphragm.

In some embodiments, refueling lock 45 may be a filler pipe valve located at a mouth of fuel filler pipe 11. In such embodiments, refueling lock 45 may not prevent the removal of fuel cap 105. Rather, refueling lock 45 may prevent the insertion of dispensing nozzle 72 into fuel filler pipe 11. The filler pipe valve may be electrically locked, for example by a solenoid, or mechanically locked, for example by a pressure diaphragm.

In some embodiments, refueling lock 45 may be a refueling door lock, such as a latch or a clutch which locks a refueling door located in a body panel of the vehicle. The refueling door lock may be electrically locked, for example by a solenoid, or mechanically locked, for example by a pressure diaphragm.

In embodiments where refueling lock 45 is locked using an electrical mechanism, refueling lock 45 may be unlocked by commands from controller 12, for example, when a fuel tank pressure decreases below a pressure threshold. In embodiments where refueling lock 45 is locked using a mechanical mechanism, refueling lock 45 may be unlocked via a pressure gradient, for example, when a fuel tank pressure decreases to atmospheric pressure.

As discussed, fuel vapors 107 from recirculation line 31, may flow into filler neck 11, and back into fuel tank 20. Thus a portion of fuel vapors 107 in the fuel tank 20, may flow out of the fuel tank into recirculation line 31, through filler neck 11, and back into the fuel tank 20.

Controller 12 may comprise a portion of a control system 14. Control system 14 is shown receiving information from a plurality of sensors 16 (various examples of which are described herein) and sending control signals to a plurality of actuators 81 (various examples of which are described herein). As one example, sensors 16 may include temperature sensor 32, universal exhaust gas oxygen (UEGO) sensor 37, temperature sensor 33, and pressure sensor 68. Other sensors such as pressure, temperature, air/fuel ratio, and composition sensors may be coupled to various locations in the vehicle system 6. As another example, the actuators may include fuel injector 66, throttle 62, FTIV 52, CVV 29, CPV 61, actuator 56 of variable orifice valve 54 (in some examples where the variable orifice valve is electronically actuatable), etc. The controller 12 may be shifted between sleep and wake-up modes for additional energy efficiency. During a sleep mode the controller may save energy by shutting down on-board sensors, actuators, auxiliary components, diagnostics, etc. Essential functions, such as clocks and controller and battery maintenance operations may be maintained on during the sleep mode, but may be operated in a reduced power mode. During the sleep mode, the controller will expend less current/voltage/power than during a wake-up mode. During the wake-up mode, the controller may be operated at full power, and components operated by the controller may be operated as dictated by operating conditions. The controller 12 may receive input data from the various sensors, process the input data, and trigger the actuators in response to the processed input data based on instruction or code programmed therein corresponding to one or more routines. An example control routine is described herein and with regard to FIG. 2.

Vehicle system 6 may be a hybrid vehicle with multiple sources of torque available to one or more vehicle wheels 92. In the example shown, vehicle system 6 may include an electric machine 93. Electric machine 93 may be a motor or a motor/generator. Crankshaft 94 of engine 10 and electric machine 93 are connected via a transmission 154 to vehicle wheels 92 when one or more clutches 172 are engaged. In the depicted example, a first clutch is provided between crankshaft 94 and electric machine 93, and a second clutch is provided between electric machine 93 and transmission 154. Controller 12 may send a signal to an actuator of each clutch 172 to engage or disengage the clutch, so as to connect or disconnect crankshaft 94 from electric machine 93 and the components connected thereto, and/or connect or disconnect electric machine 93 from transmission 154 and the components connected thereto. Transmission 154 may be a gearbox, a planetary gear system, or another type of transmission. The powertrain may be configured in various manners including as a parallel, a series, or a series-parallel hybrid vehicle.

Electric machine 93 receives electrical power from a traction battery 158 to provide torque to vehicle wheels 92. Electric machine 93 may also be operated as a generator to provide electrical power to charge traction battery 158, for example during a braking operation.

As will be discussed in further detail below with regard to the method depicted at FIG. 2, a fuel fill rate during a refueling event may be determined based on a steady state fuel system pressure (as monitored via pressure sensor 91, for example) that builds in the fuel system during such a refueling event. More specifically, there may be two lookup tables stored at the controller that correlate steady state fuel system pressure with fuel fill rate, one lookup table corresponding to summer fuel with a lower reid vapor pressure (RPV) and the other lookup table corresponding to winter fuel with a higher RVP. In other words, summer fuel has a lower RVP than winter fuel, and thus, to accurately determine fuel fill rate during a refueling event, the lookup table corresponding to summer fuel may be utilized during summer months, whereas the lookup table corresponding to winter fuel may be utilized during winter months.

The controller 12 may be coupled to a wireless communication device 156 for direct communication of the vehicle system 6 with a network cloud 160. Network cloud 160 may comprise the internet. Using wireless communication 150 via the wireless communication device 156, the vehicle system 6 may retrieve data regarding current and/or upcoming ambient conditions (such as ambient humidity, temperature, pressure, etc.) from the network cloud 160. In some examples, the wireless communication device 156 may be used to obtain information as to the current date (month), in order to infer whether fuel being added to the fuel tank during a refueling event is likely to be summer fuel or winter fuel. In other examples, if the vehicle is equipped with an onboard navigation device (e.g. GPS), capable of determining current date, then the GPS may additionally or alternatively be relied upon for inferring whether summer or winter fuel is being added to the fuel tank during refueling events.

Turning briefly now to FIG. 5, a graphic illustration 500 is depicted showing the relationship between fuel system pressure during refueling events and fuel fill rate (in gallons per minute, or GPM). Fuel system pressure is depicted on the Y axis, while time is depicted on the X axis. In other words, fuel system pressure is illustrated as a function of time during refueling events, where each individual line corresponds to a different fuel fill rate. Specifically, solid lines depict summer fuel with a lower RVP, while dashed lines depict winter fuel with a higher RVP. Line 505 corresponds to a fuel fill rate of 4 GPM, line 510 corresponds to a fuel fill rate of 6 GPM, line 515 corresponds to a fuel fill rate of 8 GPM, line 520 corresponds to a fuel fill rate of 10 GPM, and line 525 corresponds to a fuel fill rate of 12 GPM. Winter fuel shifts the curves upwards, thus dashed line 505a corresponds to a fuel fill rate of 4 GPM, dashed line 510a corresponds to a fuel fill rate of 6 GPM, dashed line 515a corresponds to a fuel fill rate of 8 GPM, dashed line 520a corresponds to a fuel fill rate of 10 GPM, and dashed line 525a corresponds to a fuel fill rate of 12 GPM.

Thus, it may be understood that, during refueling events, fuel system pressure may be monitored over time, and steady state fuel system pressure reached during said refueling events may be compared to a particular lookup table (depending on whether the fuel being dispensed is summer fuel or winter fuel), in order to infer fuel fill rate in GPM. As discussed above, the controller may make a determination as to whether the fuel being added is summer or winter fuel via the wireless communication device (e.g. 156) or navigation system (e.g. GPS).

Pressure in the recirculation line (e.g. 31) may also vary based on fuel fill rate. In FIG. 4, a graphic illustration 400 is depicted showing the relationship between pressure in the recirculation line, as estimated via an in-tank mounted pressure transducer (FTPT), during refueling events, and fuel fill rate (in gallons per minute, or GPM). Pressure transducer is typically used for degradation detection but is being repurposed to diagnose the recirculation line of the fuel vapor system. Pressure in the recirculation line is depicted on the Y axis, while time is depicted on the X axis. In other words, recirculation line pressure is illustrated as a function of time during refueling events, where each individual line corresponds to a different fuel fill rate. Specifically, line 402 may correspond to a fuel fill rate of 12 GPM, line 404 may correspond to a fuel fill rate of 6 GPM, and line 406 may correspond to a fuel fill rate of 4 GPM. Pressure in the recirculation line may be directly proportional to the fuel fill rate. Therefore during higher fuel flow rates (e.g. 11-12 GPM), the opening of variable orifice may be increased to release the pressure while during lower fuel fill rates (e.g. 4-5 GPM), and the opening of variable orifice may be decreased.

As discussed, the variable orifice valve (e.g. 54) may open to greater extents in response to greater pressures in the vapor recovery line (e.g. 31), and close to greater extents in response to lesser pressures in the vapor recovery line. Such opening/closing may be passive in the case of a spring-actuated valve, as discussed above, or may be under control of the vehicle controller in the case of an electromechanically-actuated valve. Thus, at pressures in the vapor recovery line exceeding the second threshold pressure (e.g. 11-12 GPM), it may be expected that the variable orifice valve is occupying the higher-flow position if the valve is not degraded. Alternatively, at pressures in the vapor recovery line below the first threshold pressure (e.g. 4-5 GPM), it may be expected that the variable orifice valve is occupying the lower-flow position if the valve is not degraded. Such conditions may allow for diagnosing whether the variable orifice valve is stuck open (stuck in the higher-flow position or unable to adopt the lower-flow position) or closed (stuck in the lower-flow position or unable to adopt the higher-flow position), based on a readout such as fuel system pressure, for example. The variable orifice may be may be diagnosed to be stuck in an open position during refueling at a fuel flow rate that is lower than a threshold and the variable orifice may be diagnosed to be stuck in a closed position during refueling at the fuel flow rate that is higher than the threshold, the fuel flow rate being a rate at which fuel is dispensed into a fuel tank. Most fuel filling stations dispense at a rate roughly corresponding to 8-12 GPM, and very low (4-5 GPM) or very high (>12 GPM) dispense rates are rare. In this way, by monitoring pressure in the fuel system during refueling, indications as to whether the variable orifice valve is degraded, may be determined. By diagnosing such conditions and taking mitigating action in response to such conditions, release of undesired evaporative emissions (e.g. fuel vapors) to atmosphere may be reduced.

In this way, the system discussed above at FIG. 1 may enable an engine system comprising a controller with computer readable instructions stored on non-transitory memory that, when executed, cause the controller to: during a refueling event, indicate degradation of a variable orifice positioned in a fuel vapor recovery line for recirculating fuel vapors back to a fuel tank of a fuel system based on a difference between an expected fuel system pressure as retrieved from a database and a fuel system pressure as estimated via a fuel tank pressure transducer (FTPT) sensor.

Turning now to FIG. 2, a flow chart for a high-level example method 200 is depicted for, carrying out a diagnostic pertaining to whether the variable orifice is stuck at an open position or a closed position (stuck in a higher-flow or lower-flow configuration). By conducting such diagnostics, bleed-through emissions, either break-through from the canister or break-through from the fuel filler inlet, may be reduced or avoided. Canister function and lifetime may be improved/extended.

Method 200 will be described with reference to the systems described herein and shown in FIG. 1, though it should be understood that similar methods may be applied to other systems without departing from the scope of this disclosure. Method 200 may be carried out by a controller, such as controller 12 in FIG. 1, and may be stored at the controller as executable instructions in non-transitory memory. Instructions for carrying out method 200 and the rest of the methods included herein may be executed by the controller based on instructions stored on a memory of the controller and in conjunction with signals received from sensors of the engine system, such as the sensors described above with reference to FIG. 1.

Method 200 begins at 202 and may include estimating and/or measuring vehicle operating conditions. Operating conditions may be estimated, measured, and/or inferred, and may include one or more vehicle conditions, such as vehicle speed, vehicle location, etc., various engine conditions, such as engine status, engine load, engine speed, A/F ratio, manifold air pressure, etc., various fuel system conditions, such as fuel level, fuel type, fuel temperature, etc., various evaporative emissions system conditions, such as fuel vapor canister load, fuel tank pressure, etc., as well as various ambient conditions, such as ambient temperature, humidity, barometric pressure, etc.

Proceeding to 204, the routine may include determining if a refueling event has been indicated. A refueling event may be indicated in response to a request from a vehicle operator to initiate refueling, for example in response to the vehicle operator pressing an appropriate button on the dash, etc. A refueling event may be additionally or alternatively indicated responsive to a fuel cap (e.g. 105) being indicated to be removed from a fuel filler inlet (e.g. 19), an indication that a refueling lock (e.g. 45) has been unlocked, etc. A refueling event may be additionally or alternatively indicated in response to an indication that fuel level in the fuel tank is increasing consistently (e.g. linearly) over a period of time (e.g. 5-10 seconds), as monitored for example via a fuel level sensor (e.g. 34 in FIG. 1).

If, at 204, if a refueling event is not indicated, method 200 may proceed to 226. At 226, method 200 may include maintaining current vehicle operating conditions. For example, if the vehicle in operation is being propelled via the engine, or at least in part via the motor (e.g. 93 in FIG. 1), then such vehicle operation conditions may be maintained. Method 200 may then end.

Returning to 204, in response to a refueling event being indicated, method 200 may proceed to 206. While not explicitly illustrated, it may be understood that for vehicles equipped with an FTIV (e.g. 52 in FIG. 1), in response to the request for refueling, the FTIV may be commanded open via the controller and refueling may be enabled to commence (e.g. the refueling lock may be commanded open) in response to pressure in the fuel system being within a threshold of atmospheric pressure (e.g. not different than atmospheric pressure by greater than a 5% difference).

At 206, method 200 may include monitoring fuel system pressure to infer a fuel fill rate, for example in Gallons per minute (GPM). As discussed above, such an inference may be made via the controller monitoring a steady state pressure in the fuel system during the refueling event, and querying an appropriate lookup table stored at the controller to determine the fuel fill rate in GPM. The appropriate lookup table (e.g. a lookup table corresponding to summer fuel or a lookup table corresponding to winter fuel) may be determined via the controller based on whether it is likely that summer fuel is being added to the fuel tank or if winter fuel is being added to the fuel tank. Such a determination may be based on the controller determining the date, for example via wireless communication with internet or via an onboard navigation device (e.g. GPS), etc. In other words, if the month is July, then the controller may infer that the fuel being added to the fuel tank comprises summer fuel.

The controller may also determine a fuel fill rate based on monitoring a change in fuel level indicator (FIL) over a minute. The change in fuel level may be estimated via a fuel level sensor and the fuel fill rate in GPM may be computed based on the change in fuel level in the fuel tank in one minute.

Proceeding to 208, the routine may include determining whether conditions are met for conducting the diagnostic as to whether the variable orifice (e.g. 54 in FIG. 1) is stuck open, or in other words, stuck in the higher-flow position or unable to adopt the lower-flow configuration. Conditions being met at 208 may include an indication that canister purging operations are not occurring as frequently as expected or predicted as a function of refueling events, diurnal temperature fluctuations, engine run-time, etc. More specifically, canister purging operations where the canister is cleaned of stored fuel vapors may be requested based on estimated canister loading state. Such an estimate may be provided via one or more canister temperature sensor(s) (e.g. 32 in FIG. 1). If the controller is requesting/scheduling canister purging events less frequently than would be expected, then the lower amount of canister loading may be due to the variable orifice being stuck in the higher-flow configuration. Another possibility for such a lower rate of canister loading may be due to a source of undesired evaporative emissions stemming from the vapor storage line (e.g. 78 in FIG. 1) and/or vapor recovery line (e.g. 31 in FIG. 1), fuel tank, etc. Thus, conditions being met for conducting the diagnostic for the variable orifice being stuck in the higher-flow position may further include an indication that the vapor storage line, vapor recovery line, fuel system and evaporative emissions system are free from undesired evaporative emissions.

Tests for the presence or absence of undesired evaporative emissions stemming from the fuel system and/or evaporative emissions system may include communicating a negative pressure with respect to atmospheric pressure on the fuel system and evaporative emissions system with the fuel system and evaporative emissions system otherwise sealed from atmosphere. The negative pressure may be applied via communicating engine intake manifold vacuum to the fuel system and evaporative emissions system. In other words, with the engine operating to combust air and fuel, intake manifold vacuum may be applied on the fuel system and evaporative emissions system via commanding open the CPV (e.g. 61 in FIG. 1), commanding open the FTIV (e.g. 52 in FIG. 1), and commanding closed the CVV (e.g. 29 in FIG. 1). In response to a threshold negative pressure being reached, as monitored via the FTPT (e.g. 91 in FIG. 1), the fuel system and evaporative emissions system may be sealed from engine intake via commanding closed the CPV. A rate of pressure bleed-up may thus be monitored in the sealed fuel system and evaporative emissions system, and compared to an expected rate of pressure bleed-up under circumstances where there is no source of undesired evaporative emissions stemming from the fuel system and evaporative emissions system. If the rate of pressure bleed-up is not different from the expected rate of pressure bleed-up by more than a threshold, then it may be determined that the fuel system and evaporative emissions system are free from undesired evaporative emissions. While the use of engine manifold vacuum for conducting such a diagnostic is discussed, in other examples a pump positioned in the evaporative emissions system may be utilized for applying a negative pressure on the fuel system and evaporative emissions system to conduct such a test for the presence or absence of undesired evaporative emissions, without departing from the scope of this disclosure. In still other examples, a positive pressure may be introduced to the fuel system and evaporative emissions system (for example via a pump as discussed), and in similar fashion, a pressure bleed-down rate may be compared to an expected pressure bleed-down rate in order to infer presence or absence of undesired evaporative emissions.

Conditions being met at 208 may additionally or alternatively include a threshold duration of time elapsing since a prior test diagnostic as to whether the variable orifice valve is stuck in the higher-flow position. For example, such diagnostics may be periodically conducted (e.g. once every 10 days, once every 20 days, once every 30 days, etc.) during refueling events, to assess whether the variable orifice valve is degraded.

Conditions being met at 208 may additionally or alternatively include an indication that the fuel fill rate is within a range of a desired fuel fill rate for conducting the diagnostic. For example, if the fuel fill rate is determined to be lower than a threshold fuel fill rate such as below 7 GPM. Other such threshold are possible, without departing from the scope of this disclosure.

If it is determined that conditions are met for carrying out diagnostics for a variable orifice valve to be stuck in an open position, at 210, pressure (P) in the fuel system may be estimated via the FTPT. The fuel system pressure may be monitored throughout the refueling event. At the onset of fueling, the fuel system pressure may increase at a higher rate and then reach a steady state (plateau) with the pressure increasing at a lower rate.

At 212, the controller may retrieve an expected fuel system pressure (P1) corresponding to the current fuel fill rate. The controller may maintain a database (such as shown in FIG. 5) of fuel system pressure during refueling events corresponding to each fuel fill rate (in gallons per minute, or GPM) and season. In one example, if it is determined the current fuel fill rate is 5 GPM and the month is July, the controller may retrieve the fuel system pressure (over time) for 5 GPM summer refueling from the database. As such, a dataset corresponding to the change in pressure during refueling at the current fuel fill rate may be retrieved. The fuel system pressure (corresponding to each second) during the current refueling event may be compared to the expected fuel system pressure (at the same instant of time).

At 214, the routine includes determining if the fuel system pressure (P) during the current refueling event is lower than the expected fuel system pressure (P1). In one example, the routine may determine if P is lower than P1 by a threshold percentage, such as 10%. During refueling using a lower fuel fill rate, the opening of the variable orifice is expected to decrease. However, if the variable orifice is stuck in an open position, a higher amount of fuel vapor may be recirculated without flowing to the canister. The fuel system pressure as estimated by the FTPT may be directly proportional to the flow into the canister. Increased fuel vapor recirculation and decreased vapor storage in the canister may lead to fuel vapor escaping to the atmosphere through the filler neck.

If it is determined that the fuel system pressure (P) during the current refueling event is lower than the expected fuel system pressure (P1), it may be inferred that the vapor flow rate reaching the canister is lower than expected, thereby indicating increased fuel vapor recirculation through a variable orifice stuck in an open position. Therefore, at 218, a flag may be set to indicate that the variable orifice is stuck at an open position and is not able to transition to a lower flow configuration (smaller variable orifice opening) during refueling at a lower fuel fill rate. In one example, a diagnostic code may be set and the vehicle operator may be notified via a dashboard message. Further, the canister may be purged more often in response to the indication of degradation.

At 222, in response to the detection of the variable orifice being stuck at an open position, one or more vehicle operating parameters may be updated. In one example, updating operating parameters may include scheduling the vehicle to duty cycle the CPV during future refueling events for brief periods of time, to provide a route for fuel vapors to travel to the engine intake where they may be adsorbed by the AIS HC trap, rather than being routed to atmosphere through the fuel fill inlet due to the variable orifice valve being stuck in the higher-flow position.

If it is determined, at 214, that the fuel system pressure (P) during the current refueling event is substantially equal (such as within a 10% margin) to the expected fuel system pressure (P1), at 216, the controller may indicate that the variable orifice is not stuck in an open position and that the opening of the orifice has adapted to the lower fuel fill rate.

FIG. 3A shows an example plot 300 used for diagnostics of the variable orifice during refueling at a lower fuel fill rate. The x-axis denotes time and the y-axis denotes fuel system pressure as estimated by the FTPT sensor. Line 302 shows an expected fuel system pressure corresponding to the estimated fuel fill rate and season. Line 304 shows an estimated fuel system pressure during the refueling event. As seen from the plot, the fuel system pressure (both expected and estimated) may first steadily increase at the onset of the refueling event and then may stabilize and remain plateaued (with a smaller rate of increase) throughout the remaining time of the refueling event. In response to the estimated fuel system pressure being lower than that expected pressure, it may be inferred that in this example, the variable orifice is stuck in an open position and has not adapted to the lower fuel fill rate.

Returning to FIG. 2, at 224, the routine includes determining if conditions are met for conducting the diagnostic as to whether the variable orifice is stuck closed, or in other words, stuck in the lower-flow position or unable to adopt the higher-flow configuration. The lower-flow position is referred to herein as the stuck closed position. As such, the variable orifice may be labeled as stuck closed even if its opening is non-zero but lower than the expected opening at the higher-flow configuration. If at 208, it is determined that conditions are not met for carrying out diagnostic to determine if the variable orifice is stuck open, the routine may also directly proceed to step 224.

Conditions being met may include an indication that canister purging operations are occurring more frequently than expected or predicted as a function of refueling events, diurnal temperature fluctuations, engine run time, etc. More specifically, as discussed above, canister purging operations where the canister is cleaned of stored fuel vapors may be requested based on estimated canister loading state. If the controller is requesting/scheduling canister purging events more frequently than would otherwise be expected, then the greater amount of canister loading may be due to the variable orifice valve being stuck in the lower-flow configuration. In another example, if the canister is being loaded to greater extents than would be expected for particular refueling events, then the culprit may be that the variable orifice valve is stuck in the lower-flow configuration. For example, the canister temperature sensor may be used to infer canister loading state during refueling events, and based on the amount of fuel added to the fuel tank, if the amount of canister loading deviates from (is greater than) an expected amount of canister loading for such refueling events, then the variable orifice valve may be stuck in the lower-flow configuration. In still another example, an increase in bleed-through emissions, as monitored for example, via a hydrogen sensor (e.g. 157) positioned in the vent line (e.g. 27), as compared to an expected amount of bleed-through emissions under conditions where the variable orifice valve is not degraded, may be indicative of a variable orifice valve that is stuck in a lower-flow configuration. The increase in bleed-emissions may be over a predetermined time frame, for example over 1 day, several days, one or two weeks, etc.

Conditions being met may additionally or alternatively include a threshold duration of time elapsing since a prior test diagnostic as to whether the variable orifice valve is stuck in the lower-flow position. For example, such diagnostics may be periodically conducted (e.g. once every 10 days, once every 20 days, once every 30 days, etc.) during refueling events, to assess whether the variable orifice valve is degraded.

Conditions being met may additionally or alternatively include an indication that the fuel system is free from any source of undesired evaporative emissions, as discussed above with regard to step 208.

Conditions being met may additionally or alternatively include an indication that the fuel fill rate is within a range of a desired fuel fill rate for conducting the diagnostic. For example, if the fuel fill rate is determined to be higher than a threshold fuel fill rate such as above 9 GPM. Other such threshold are possible, without departing from the scope of this disclosure.

If it is determined that conditions are not met for carrying out diagnostic to determine if the variable orifice is stuck closed, at 226, current vehicle operating conditions may be maintained. In other words, refueling may proceed without the diagnostic as to whether the variable orifice valve is stuck in the lower-flow configuration or a higher-flow configuration.

If it is determined that conditions are met for carrying out diagnostics for a variable orifice valve to be stuck in a closed position, at 220, pressure (P) in the fuel system may be estimated via the FTPT. The fuel system pressure may be monitored throughout the refueling event. The fuel system pressure may increase at a higher rate and then reach a steady state (plateau) with the pressure increasing at a lower rate.

At 228, the controller may retrieve expected fuel system pressure (P2) corresponding to the current fuel fill rate from the database (such as shown in FIG. 5). In one example, if it is determined the current fuel fill rate is 12 GPM and the month is January, the controller may retrieve the fuel system pressure (over time) for 12 GPM winter refueling from the database. As such, a dataset corresponding to the change in pressure during refueling at the current fuel fill rate may be retrieved. The fuel system pressure (corresponding to each second) during the current refueling event may be compared to the expected fuel system pressure (at the same instant of time).

At 230, the routine includes determining if the fuel system pressure (P) during the current refueling event is higher than the expected fuel system pressure (P2). In one example, the routine may determine if P is higher than P2 by a threshold percentage, such as 10%. During refueling using a higher fuel fill rate, the opening of the variable orifice is expected to increase. However, if the variable orifice is stuck in a closed position, a higher amount of vapor may flow into canister (without circulating through the variable orifice. The fuel system pressure, as estimated by the FTPT, may be directly proportional to the flow into the canister. Increased vapor flow to the canister may lead to the canister being saturated and overloaded.

If it is determined that the fuel system pressure (P) during the current refueling event is higher than the expected fuel system pressure (P1), it may be inferred that the vapor flow rate reaching the canister is higher than expected, thereby indicating decreased fuel vapor recirculation through the variable orifice stuck in a closed position. Therefore, at 234, a flag may be set to indicate that the variable orifice is stuck at a closed position and is not able to transition to a higher flow configuration (larger variable orifice opening) during refueling at a higher fuel fill rate. In one example, a diagnostic code may be set and the vehicle operator may be notified via a dashboard message. Further, the canister may be purged less often in response to the indication of degradation.

The routine may then proceed to 222. In response to the detection of the variable orifice being stuck at a closed position, one or more vehicle operating parameters may be updated. In one example, updating operating parameters may include scheduling purging of the canister at the first available opportunity to rapidly clean the canister of fuel vapors after refueling events, as the canister may be loaded to a greater extent than usual and which may thus lead to bleed emissions if not rapidly cleaned. As one example, for hybrid vehicles where engine run-time may be limited, after refueling if the vehicle is activated in an electric-only mode of operation, the controller may command on the engine in order to purge the canister, rather than waiting for the next engine-on event.

If it is determined at 230, that the fuel system pressure (P) during the current refueling event is substantially equal (such as within a 10% margin) to the expected fuel system pressure (P2), at 232, the controller may indicate that the variable orifice is not stuck in a closed position and that the opening of the orifice has been adapted to the higher fuel fill rate.

FIG. 3B shows an example plot 350 used for diagnostics of the variable orifice during refueling at a lower fuel fill rate. The x-axis denotes time and the y-axis denotes fuel system pressure as estimated by the FTPT sensor. Line 354 shows an expected fuel system pressure corresponding to the estimated fuel fill rate and season. Line 352 shows an estimated fuel system pressure during the refueling event. As seen from the plot, the fuel system pressure (both expected and estimated) may first steadily increase at the onset of the refueling event and then may stabilize and remain plateaued (with a smaller rate of increase) throughout the remaining time of the refueling event. In response to the estimated fuel system pressure being consistently higher than that expected pressure, it may be inferred that in this example, the variable orifice is stuck in a closed position and has not adapted to the higher fuel fill rate.

In this way, during a first condition, a variable orifice valve housed in a fuel vapor recovery line may be indicated to be stuck in a higher-flow configuration based on an estimated first fuel system pressure being lower than an expected first fuel system pressure and during a second condition, the variable orifice valve may be indicated to be stuck in a lower-flow configuration based on an estimated second fuel system pressure being higher than an expected second fuel system pressure. The first condition may include a first refueling event where a fuel tank is filled at a lower than threshold fuel fill rate and the second condition may include a second refueling event where the fuel tank is filled at a higher than threshold fuel fill rate.

Turning now to FIG. 6, it illustrates an example timeline 600 for conducting a diagnostic to determine whether the variable orifice valve is stuck in the high-flow configuration (otherwise referred to herein as stuck open), according to the method of FIG. 2.

The first plot, line 602, indicates whether a refueling event is underway (yes or no). The second plot, line 604, shows a change in fuel level in the fuel tank as monitored via a fuel level indicator (FLI), over time. Fuel level in the fuel tank may increase (+) or decrease (−) over time. The third plot, line 606, indicates whether conditions are met for conducting the stuck-open (S.O.) variable orifice valve (VOV) diagnostic (yes or no). The fourth plot, line 608, shows a position of a fuel tank isolation valve (such as FTIV 52 in FIG. 1). The FTIV may be either open or closed. The fifth plot, line 610, shows a pressure in the fuel system as monitored by the FTPT (e.g. 91), over time. In this example timeline pressure in the fuel system may be either at atmospheric pressure, or increased (+) as compared to atmospheric pressure. An expected change in pressure during refiling with a lower fuel fill rate is shown by dashed line 612. The sixth plot, line 616, indicates if the VOV is stuck in an open position.

At time t0, a refueling event is not indicated, and thus conditions are not indicated to be met for conducting the diagnostic as to whether the VOV is stuck in the high-flow position (Fuel level in the fuel tank is relatively low) and the FTIV is closed. As the FTIV is closed, pressure in the fuel tank is greater than atmospheric pressure. In other words, pressure has built in the sealed fuel tank. At time t0 it has not been yet conclusively indicated that the VOV is stuck open. While not explicitly illustrated, it may be understood that at time t0 the vehicle is in operation, being propelled by either engine operation, electrical operation, or some combination. In this example, the vehicle is traveling to a fuel filling station.

Accordingly, at time t1, the vehicle has reached the fuel filling station and a request for refueling has been initiated by the vehicle operator. Accordingly, the vehicle controller receives the request, and commands open the FTIV, in order to depressurize the fuel tank prior to fuel being added to the tank. With the fuel tank thus coupled to atmosphere, pressure in the fuel system decays to atmospheric pressure between time t1 and t2.

At time t3, immediately after the fuel system pressure reducing to atmospheric pressure, fueling is initiated and fuel is added to the fuel tank. Between time t3 and t4, due to fuel being added to the fuel tank, pressure builds in the fuel system. At time t4, the pressure reaches a steady state. With the pressure having reached the steady state, the vehicle controller determines the current date (e.g. via wireless communication with the internet or some other means like GPS, etc.), such that the appropriate lookup table is queried to determine the fuel fill rate in GPM. In this example, it may be understood that by time t4, the controller has queried the appropriate lookup table and has indicated that the fuel fill rate is within the range of a desired fuel fill rate for conducting the diagnostic. In this example timeline, it may be understood that the fuel fill rate is determined to be 6 GPM.

With the fuel fill rate determined to be within the range of the desired fuel fill rate for conducting the stuck open diagnostic, conditions are indicated to be met for conducting the diagnostic. Conditions being met also include an indication that the fuel system is free from a presence of undesired evaporative emissions. Conditions being met further include an indication that the test diagnostic is requested. Such a request may be in relation to a predetermined amount of time elapsing since the valve functionality was last assessed, an indication that the canister is being loaded to a lesser than expected amount during refueling events (monitored for example via the canister temperature sensor), that requests to purge the canister are less frequent than expected if the VOV was functioning as expected, etc.

With conditions being met at time t4, the controller initiates the diagnostics by retrieving an expected fuel system pressure corresponding to the current fuel fill rate and season from a database and comparing the expected fuel system pressure to the currently estimated fuel system pressure throughout the duration of the refueling event. It is observed that the estimated fuel system pressure is substantially equal (within 10%) of the expected fuel system pressure, thereby confirming that the variable orifice is not stuck in an open position and is able to switch to a position suitable for refueling with a lower fuel fill rate.

At time t5, a rapid increase in pressure builds in the fuel tank. Due to the fuel tank being filled to capacity, and with the FLVV closed, pressure builds which results in an automatic shutoff of the fuel dispenser. Accordingly, between time t5 and t6, pressure in the fuel system rapidly returns to atmospheric pressure, and refueling is no longer indicated to be requested. With pressure at atmospheric pressure in the fuel system, the FTIV is commanded closed. Also, in response to the rapid increase in fuel tank pressure, the variable orifice diagnostics may be concluded at time t5. It may be understood that the pressure builds because the fill limit venting valve (FLVV) closes. Between time t6 and t7, while not explicitly illustrated, it may be understood that vehicle operating conditions are updated in response to the refueling event. Specifically, fuel level in the fuel tank is updated, and canister loading state is updated.

However, between time t4 and t5, if the estimated fuel system pressure, as shown by dotted line 611, would have been substantially lower (such as greater than 10%) than the expected fuel system pressure, a stuck open variable orifice valve would have been identified. In response to the variable orifice valve being stuck in an open position, a flag, as indicated by dashed line 618 would have been set at time t5.

FIG. 7 shows an example timeline 700 for conducting a diagnostic to determine whether the variable orifice valve is stuck in the low-flow configuration (otherwise referred to herein as stuck closed), according to the method of FIG. 2.

The first plot, line 702, indicates whether a refueling event is underway (yes or no). The second plot, line 704, shows a change in fuel level in the fuel tank as monitored via a fuel level indicator (FLI), over time. Fuel level in the fuel tank may increase (+) or decrease (−) over time. The third plot, line 706, indicates whether conditions are met for conducting the stuck-open (S.O.) variable orifice valve (VOV) diagnostic (yes or no). The fourth plot, line 708, shows a position of a fuel tank isolation valve (such as FTIV 52 in FIG. 1). The FTIV may be either open or closed. The fifth plot, line 710, shows a pressure in the fuel system as monitored by the FTPT (e.g. 91), over time. In this example timeline pressure in the fuel system may be either at atmospheric pressure, or increased (+) as compared to atmospheric pressure. An expected change in pressure during refiling with a lower fuel fill rate is shown by dashed line 712. The sixth plot, line 716, indicates if the VOV is stuck in a closed position.

At time t0, a refueling event is not indicated, and thus conditions are not indicated to be met for conducting the diagnostic as to whether the VOV is stuck in the low-flow position (fuel level in the fuel tank is relatively low) and the FTIV is closed. As the FTIV is closed, pressure in the fuel tank is greater than atmospheric pressure. In other words, pressure has built in the sealed fuel tank. At time t0 it has not been yet conclusively indicated that the VOV is stuck closed. While not explicitly illustrated, it may be understood that at time t0 the vehicle is in operation, being propelled by either engine operation, electrical operation, or some combination. In this example, the vehicle is traveling to a fuel filling station.

Accordingly, at time t1, the vehicle has reached the fuel filling station and a request for refueling has been initiated by the vehicle operator. Accordingly, the vehicle controller receives the request, and commands open the FTIV, in order to depressurize the fuel tank prior to fuel being added to the tank. With the fuel tank thus coupled to atmosphere, pressure in the fuel system decays to atmospheric pressure between time t1 and t2.

At time t3, immediately after the fuel system pressure reducing to atmospheric pressure, fueling is initiated and fuel is added to the fuel tank. Between time t3 and t4, due to fuel being added to the fuel tank, pressure builds in the fuel system. At time t4, the pressure reaches a steady state. With the pressure having reached the steady state, the vehicle controller determines the current date (e.g. via wireless communication with the internet or some other means like GPS, etc.), such that the appropriate lookup table is queried to determine the fuel fill rate in GPM. In this example, it may be understood that by time t4, the controller has queried the appropriate lookup table and has indicated that the fuel fill rate is within the range of a desired fuel fill rate for conducting the diagnostic. In this example timeline, it may be understood that the fuel fill rate is determined to be 12 GPM.

With the fuel fill rate determined to be within the range of the desired fuel fill rate for conducting the stuck open diagnostic, conditions are indicated to be met for conducting the diagnostic. Conditions being met also include an indication that the fuel system is free from a presence of undesired evaporative emissions. Conditions being met further include an indication that the test diagnostic is requested. Such a request may be in relation to a predetermined amount of time elapsing since the valve functionality was last assessed, an indication that the canister is being loaded to a lesser than expected amount during refueling events (monitored for example via the canister temperature sensor), that requests to purge the canister are less frequent than expected if the VOV was functioning as expected, etc.

With conditions being met at time t4, the controller initiates the diagnostics by retrieving an expected fuel system pressure corresponding to the current fuel fill rate and season from a database and comparing the expected fuel system pressure to the currently estimated fuel system pressure throughout the duration of the refueling event. It is observed that the estimated fuel system pressure is substantially equal (within 10%) of the expected fuel system pressure, thereby confirming that the variable orifice is not stuck in a closed position and is able to switch to a position suitable for refueling with a higher fuel fill rate.

At time t5, a rapid increase in pressure builds in the fuel tank. Due to the fuel tank being filled to capacity, and with the FLVV closed, pressure builds which results in an automatic shutoff of the fuel dispenser. Accordingly, between time t5 and t6, pressure in the fuel system rapidly returns to atmospheric pressure, and refueling is no longer indicated to be requested. With pressure at atmospheric pressure in the fuel system, the FTIV is commanded closed. Also, in response to the rapid increase in fuel tank pressure, the variable orifice diagnostics may be concluded at time t5. It may be understood that the pressure builds because the fill limit venting valve (FLVV) closes. Between time t6 and t7, while not explicitly illustrated, it may be understood that vehicle operating conditions are updated in response to the refueling event. Specifically, fuel level in the fuel tank is updated, and canister loading state is updated.

However, between time t4 and t5, if the estimated fuel system pressure, as shown by dotted line 711, would have been substantially higher (such as greater than 10%) than the expected fuel system pressure, a stuck closed variable orifice valve would have been identified. In response to the variable orifice valve being stuck in a closed position, a flag, as indicated by dashed line 718 would have been set at time t5.

In this way, by monitoring fuel system pressure during a refueling event, a variable orifice valve in a fuel vapor recovery line in a vehicle fuel system may be opportunistically diagnosed as to whether it is stuck in a high-flow or low-flow configuration. By conducting such diagnostics, bleed-through emissions, either break-through from the canister or break-through from the fuel filler inlet, may be reduced or avoided. Canister function and lifetime may be improved/extended.

An example method comprises: during a refueling event, in response to a first inferred fuel fill rate, diagnosing whether a variable orifice positioned in a fuel vapor recovery line is stuck in a first state, and in response to a second inferred fuel fill rate, diagnosing whether the variable orifice is stuck in a second state including diagnosing the first state and the second state based on an estimated fuel system pressure. In any preceding example, additionally or optionally, the first inferred fuel fill rate is below a first threshold fuel fill rate, and wherein the second fuel fill rate is above a second threshold fuel fill rate. In any or all of the preceding examples, additionally or optionally, the first state comprises the variable orifice valve being stuck in an open position, and wherein the second state comprises the variable orifice valve being stuck in a closed position. In any or all of the preceding examples, additionally or optionally, the first inferred fuel fill rate and the second fuel fill rate are inferred based on one or more of the estimated fuel system pressure and a fuel level change over time during the refueling event. In any or all of the preceding examples, additionally or optionally, the variable orifice is diagnosed to be stuck in the first state in response to the estimated fuel system pressure being lower than a first expected fuel system pressure, the first expected fuel system pressure being a function of the first inferred fuel fill rate and ambient weather conditions. In any or all of the preceding examples, additionally or optionally, the variable orifice is diagnosed to be stuck in the second state in response to the estimated fuel system pressure being higher than a second expected fuel system pressure, the second expected fuel system pressure being a function of the second inferred fuel fill rate and the ambient weather conditions. In any or all of the preceding examples, additionally or optionally, each of the first expected fuel system pressure and the second expected fuel system pressure are retrieved from a database storing expected fuel system pressure data corresponding to a plurality of fuel fill rates and ambient weather conditions. In any or all of the preceding examples, the method further comprising, additionally or optionally, in response to the variable orifice being stuck in the first state, during an immediately subsequent refueling event, duty cycling a canister purge valve housed in a purge line coupling a fuel vapor system to an engine intake manifold to route fuel vapor to the engine intake manifold. In any or all of the preceding examples, the method further comprising, additionally or optionally, in response to the variable orifice being stuck in the second state, after completion of the refueling event, increasing a purging frequency of a fuel vapor canister of the fuel vapor system. In any or all of the preceding examples, additionally or optionally, the fuel vapor recovery line recirculates fuel vapors back to a fuel tank to reduce an amount of fuel vapors that loads the fuel vapor canister, the variable orifice regulating fuel vapor flow through the fuel vapor recovery line.

Another engine example method, comprises: during a first condition, indicating a variable orifice valve housed in a fuel vapor recovery line to be stuck in a higher-flow configuration based on an estimated first fuel system pressure being lower than an expected first fuel system pressure, and during a second condition, indicating the variable orifice valve to be stuck in a lower-flow configuration based on an estimated second fuel system pressure being higher than an expected second fuel system pressure. The method may include operating the system in each of the first and second conditions at different times so that each possible stuck condition is checked. In any preceding example, additionally or optionally, the higher-flow configuration comprises a maximal extent the variable orifice valve can open and the lower-flow configuration comprises a maximal extent the variable orifice valve can close. In any or all of the preceding examples, additionally or optionally, the first condition includes a first refueling event where a fuel tank is filled at a lower than threshold fuel fill rate and the second condition includes a second refueling event where the fuel tank is filled at a higher than threshold fuel fill rate. In any or all of the preceding examples, additionally or optionally, the variable orifice valve adopts to the lower-flow configuration during refueling at the lower than threshold fuel fill rate and variable orifice valve adopts to the higher-flow configuration during refueling at the higher than threshold fuel fill rate. In any or all of the preceding examples, additionally or optionally, the lower than threshold fuel fill rate is inferred as a function of one or more of the first estimated fuel system pressure and a rate of increase in fuel level in the fuel tank and wherein the higher than threshold fuel fill rate is inferred as another function of one or more of the second estimated fuel system pressure and the rate of increase in fuel level in the fuel tank. In any or all of the preceding examples, additionally or optionally, each of the expected first fuel system pressure and the expected second fuel system pressure, as retrieved from an on-board or an off board database, are a function of a fuel fill rate and season.

Yet another example engine system, comprises: a controller with computer readable instructions stored on non-transitory memory that, when executed, cause the controller to: during a refueling event, indicate degradation of a variable orifice positioned in a fuel vapor recovery line for recirculating fuel vapors back to a fuel tank of a fuel system based on a difference between an expected fuel system pressure as retrieved from a database and a fuel system pressure as estimated via a fuel tank pressure transducer (FTPT) sensor. In any preceding example, additionally or optionally, indicating degradation includes indicating that the variable orifice is stuck in an open position during refueling at a fuel flow rate that is lower than a threshold and indicating that the variable orifice is stuck in a closed position during refueling at the fuel flow rate that is higher than the threshold, the fuel flow rate being a rate at which fuel is dispensed into a fuel tank. In any or all of the preceding examples, additionally or optionally, the expected fuel system pressure is based on the fuel flow rate and a month of a year. In any or all of the preceding examples, additionally or optionally, the variable orifice valve is one of passively mechanically actuated or electromechanically actuated during the refueling event as a function of fuel flow rate, the variable orifice valve opened to a maximum extend when the fuel flow rate is higher than the threshold and variable orifice valve closed to a maximum extend when the fuel flow rate is lower than the threshold.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method comprising:
during a refueling event, in response to a first inferred fuel fill rate, diagnosing whether a variable orifice positioned in a fuel vapor recovery line is stuck in a first state, and in response to a second inferred fuel fill rate, diagnosing whether the variable orifice is stuck in a second state including diagnosing the first state and the second state based on an estimated fuel system pressure.

2. The method of claim 1, wherein the first inferred fuel fill rate is below a first threshold fuel fill rate, and wherein the second inferred fuel fill rate is above a second threshold fuel fill rate, the method including operating with each of the first inferred fuel fill rate and the second inferred fuel fill rate.

3. The method of claim 1, wherein the first state comprises the variable orifice valve being stuck in an open position, and wherein the second state comprises the variable orifice valve being stuck in a closed position.

4. The method of claim 1, wherein the first inferred fuel fill rate and the second fuel fill rate are inferred based on one or more of the estimated fuel system pressure and a fuel level change over time during the refueling event.

5. The method of claim 1, wherein the variable orifice is diagnosed to be stuck in the first state in response to the estimated fuel system pressure being lower than a first expected fuel system pressure, the first expected fuel system pressure being a function of the first inferred fuel fill rate and ambient weather conditions.

6. The method of claim 5, wherein the variable orifice is diagnosed to be stuck in the second state in response to the estimated fuel system pressure being higher than a second expected fuel system pressure, the second expected fuel system pressure being a function of the second inferred fuel fill rate and the ambient weather conditions.

7. The method of claim 6, wherein each of the first expected fuel system pressure and the second expected fuel system pressure are retrieved from a database storing expected fuel system pressure data corresponding to a plurality of fuel fill rates and ambient weather conditions.

8. The method of claim 1, further comprising, in response to the variable orifice being stuck in the first state, during an immediately subsequent refueling event, duty cycling a canister purge valve housed in a purge line coupling a fuel vapor system to an engine intake manifold to route fuel vapor to the engine intake manifold.

9. The method of claim 8, further comprising, in response to the variable orifice being stuck in the second state, after completion of the refueling event, increasing a purging frequency of a fuel vapor canister of the fuel vapor system.

10. The method of claim 9, wherein the fuel vapor recovery line recirculates fuel vapors back to a fuel tank to reduce an amount of fuel vapors that loads the fuel vapor canister, the variable orifice regulating fuel vapor flow through the fuel vapor recovery line.

11. An engine method, comprising:
during a first condition, indicating a variable orifice valve housed in a fuel vapor recovery line to be stuck in a higher-flow configuration based on an estimated first fuel system pressure being lower than an expected first fuel system pressure; and
during a second condition, indicating the variable orifice valve to be stuck in a lower-flow configuration based on an estimated second fuel system pressure being higher than an expected second fuel system pressure.

12. The method of claim 11, wherein the higher-flow configuration comprises a maximal extent the variable orifice valve can open and the lower-flow configuration comprises a maximal extent the variable orifice valve can close.

13. The method of claim 11, wherein the first condition includes a first refueling event where a fuel tank is filled at a lower than threshold fuel fill rate and the second condition includes a second refueling event where the fuel tank is filled at a higher than threshold fuel fill rate.

14. The method of claim 13, wherein the variable orifice valve adopts to the lower-flow configuration during refueling at the lower than threshold fuel fill rate and variable orifice valve adopts to the higher-flow configuration during refueling at the higher than threshold fuel fill rate.

15. The method of claim 13, wherein the lower than threshold fuel fill rate is inferred as a function of one or more of the first estimated fuel system pressure and a rate of increase in fuel level in the fuel tank and wherein the higher than threshold fuel fill rate is inferred as another function of one or more of the second estimated fuel system pressure and the rate of increase in fuel level in the fuel tank.

16. The method of claim 11, wherein each of the expected first fuel system pressure and the expected second fuel system pressure, as retrieved from an on-board or an off board database, are a function of a fuel fill rate and season.

17. An engine system, comprising:
a controller with computer readable instructions stored on non-transitory memory that, when executed, cause the controller to:
during a refueling event, indicate degradation of a variable orifice positioned in a fuel vapor recovery line for recirculating fuel vapors back to a fuel tank of a fuel system based on a difference between an expected fuel system pressure as retrieved from a database and a fuel system pressure as estimated via a fuel tank pressure transducer (FTPT) sensor.

18. The system of claim 17, wherein indicating degradation includes indicating that the variable orifice is stuck in an open position during refueling at a fuel flow rate that is lower than a threshold and indicating that the variable orifice is stuck in a closed position during refueling at the fuel flow rate that is higher than the threshold, the fuel flow rate being a rate at which fuel is dispensed into a fuel tank.

19. The system of claim 18, wherein the expected fuel system pressure is based on the fuel flow rate and a month of a year.

20. The system of claim 18, wherein the variable orifice valve is one of passively mechanically actuated or electromechanically actuated during the refueling event as a function of fuel flow rate, the variable orifice valve opened to a maximum extend when the fuel flow rate is higher than the threshold and variable orifice valve closed to a maximum extend when the fuel flow rate is lower than the threshold.

* * * * *